United States Patent [19]

Burgermann et al.

[11] 4,378,148
[45] Mar. 29, 1983

[54] MEMORY CONTROLLED MOTION PICTURE APPARATUS

[75] Inventors: Norbert Burgermann; Alois Rieder, both of Munich; Horst Rossbach, Eichenau, all of Fed. Rep. of Germany

[73] Assignee: Agfa-Gevaert AG, Leverkusen, Fed. Rep. of Germany

[21] Appl. No.: 294,166

[22] Filed: Aug. 19, 1981

[30] Foreign Application Priority Data

Sep. 5, 1980 [DE] Fed. Rep. of Germany ....... 3033418

[51] Int. Cl.$^3$ .................. G03B 1/18; G03B 21/38
[52] U.S. Cl. ........................................ 352/40; 352/169
[58] Field of Search .................. 352/38, 40, 44, 166, 352/169, 191

[56] References Cited

U.S. PATENT DOCUMENTS 3,888,780 6/1975 Tucker .......................... 352/166 X
4,096,500 6/1978 Lermann et al. ................ 352/169 X Primary Examiner—Michael L. Gellner
Attorney, Agent, or Firm—Michael J. Striker

[57] ABSTRACT

A motion picture apparatus and preferably a motion picture projector. A rotary disc shutter is actuated by an electric drive and comprises a shutter sector. A claw mechanism controlled by the electric drive provides for transport of a film and the motion of the film is controlled by a solenoid having associated a solenoid plunger suitable for disengaging the claw transport mechanism after a frame transport phase. A position pulse generator provides a shutter position pulse depending on the position of the shutter sector. An output memory element connected to the electromagnet solenoid controls the energization of the electromagnet and in turn is connected to a switch and to the position pulse generator. Preferably additional memories are provided for performing functions such as controlling the advance and the reverse motion or providing for a timer or individual frame operation.

66 Claims, 12 Drawing Figures

MEMORY CONTROLLED MOTION PICTURE APPARATUS

BACKGROUND OF THE INVENTION

1. Field of the Invention

The present invention relates to a motion picture apparatus and preferably to a motion picture projector having a rotarty shutter driven by an electric drive and a claw mechanism for the film transport and controlled by an electric drive

2. Brief Description of the Background of the Invention Including Prior Art

A motion picture projector has to provide for moving the film through the image plane and to assure by some mechanism such as a claw mechanism or a maltese cross mechanism that at the same time each frame is stationary when projected on the screen.

It furthermore has been desirable to control the motion of the film such that in any situation a frame is positioned accurately at the film gate. However, in the past such mechanisms were largely based on mechanical provisions and were not adequately coordinated to each other.

SUMMARY OF THE INVENTION

1. Purposes of the Invention

It is an object of the present invention to provide a motion picture apparatus which allows to control electronically the proper position standstill of the film, the coupling of the claw mechanism with the film and the decoupling of the claw mechanism from the film.

It is another object of the present invention to provide a motion picture projector where the film motion is controlled electronically with simple means and in reliable fashion after the claw pull down phase while the claw pauses and the film is in standstill position.

It is a further object of the present invention to provide a motion picture apparatus which treats the film gently and easy.

These and other objects and advantages of the present invention will become evident from the description which follows.

2. Brief Description of the Invention

The present invention provides a motion picture apparatus which comprises a rotary disc shutter actuated by an electric drive device, a shutter sector forming part of the rotary disc shutter, a claw mechanism controlled by the electric drive device and providing for transport of a film and a solenoid plunger associated with an electromagnet and suitable for disengaging the claw transport mechanism after a film transport phase for controlling the motion of the film. A position pulse generator provides a shutter position pulse depending on the position of the shutter sector. An output memory element is connected to the elecromagnet for controlling the energization of the electromagnet and is connected to a function switch and to the position pulse generator.

Preferably, the motion picture apparatus is a projector. The position pulse generator can provide a pulse during the blocking time of the shutter.

A control means can be disposed at the rotary disc shutter for making available the pulses provided by the position pulse generator such that the pulses with respect to their length and phase coincide in each case with the claw pull down phase in the film transport direction. The function switch can be a film advance switch, a film stop switch, a film reverse switch or a switch for another desirable control function. Preferably, the output memory element is an output memory flip-flop.

The memory flip-flop can be fed with a position pulse edge at the end of the claw pull down phase following to a control signal from the function switch via the set or clock input for providing position determining and setting energization and deenergization of the electromagnet at the end of the claw pull down phase of the claw mechanism. The apparatus can further comprise a second memory flip-flop connected to the function switch for storing the signal provided by the function switch as an intermediate memory flip-flop and connected to the output memory flip-flop for transmitting the stored signal at the end of the claw pull down phase. A stop prememory can be disposed between the stop switch and the intermediate memory flip-flop. An advance memory flip-flop can be connected to a film advance switch and the clock input (T) of the advance memory flip-flop can be connected to the pulse position generator for responding only to the pulse edge at the end of the claw pull down phase. An output (Q) of the advance memory flip-flop can be connected to the set input (S) of the output memory flip-flop. The stop switch can be connected to the intermediate memory flip-flop and the position pulse generator can be connected to the clock input (T) of the intermediate memory flip-flop such that the intermediate memory flip-flop is actuated only by the pulse edge at the start of the claw pull down phase. An output (Q) of the intermediate memory flip-flop can be connected to the reset input (R) of the advance memory flip-flop. An advance memory can be disposed between the advance switch and the advance memory flip-flop. A clear connection can be provided between the advance prememory and the output (Q) of the advance memory flip-flop.

There can also be provided an individual frame memory flip-flop coordinated to the output memory flip-flop and which individual frame memory flip-flop is necessarily in reset position upon advance operation of the motion picture apparatus. A control input (D) of the output memory flip-flop can be connected to the output (Q) of the individual frame memory flip-flop. An output (Q) of the output memory flip flop can be connected to the reset input (R) of the individual frame memory flip flop. A clock input (T) can be provided to the individual frame memory flip-flop where upon actuation of the stop switch the necessary reset of the advance memory flip-flop and the necessary set of the output memory flip-flop is lifted such that upon renewed actuation of the now as an individual frame switch acting stop switch after passing at least one position pulse, the individual frame memory flip-flop is set with the leading edge of the position pulse at the start of the claw pull down phase. The output memory flip-flop then remains set for a position pulse period starting with the trailing edge of the position pulse.

A control input can be disposed at the individual frame memory flip-flop without being connected. A control input (D) can alternatively be disposed at the individual frame memory flip-flop and can be connected to a constant potential.

There can be provided a marking signal generator for generating a signal depending on the presence of a marking in proper position on the film. A control input (D) of a frame marking memory flip-flop can be connected to the marking signal generator. A reset input (R) of the advance memory flip-flop can be connected to the output (Q) of the frame marking memory flip-flop. An inverted output ($\bar{Q}$) of the advance memory flip-flop can be connected to the reset input (R) of the frame marking memory flip-flop. A clock input (T) of the frame marking memory flip-flop can be connected to the position pulse generator and be controlled by the pulse edge at the start of the claw pull down phase.

The memory flip-flops can be D-flip-flops. The reset input and the set input of the intermediate memory flip flop can be connected to ground. The memory flip-flops can be disposed in sequence and the following memory flip-flops can have control lines from their respective outputs to the reset or respectively clear input of the preceding memory flip flop.

A frame marking prememory can be disposed between the frame marking memory flip-flop and the marking signal generator. A clear connection can be disposed between the frame marking memory and the frame marking memory flip-flop.

Function memory flip-flops can be provided for effecting desired function control of the apparatus and a reverse run memory can be connected to a reverse switch for resetting necessarily the output memory flip-flop and other function associated memory flip-flops for decoupling the claw mechanism by way of the electromagnet during a reverse run. A reverse stop memory can follow to the reverse memory and can be clearable by actuation of the stop switch such that after clearing of the reverse memory all necessary resets of memory flip-flops are lifted.

A counting chain or a delay chain can be switched on in connection with the control pulse produced upon actuation of the stop switch such that after passing of a time delay depending on the time for placing the reverse motor into standstill an output of the counting chain or delay chain, which is necessarily reset upon every other operation and function modes, is provided via a corresponding control conduit to the control input (D) of the function memory flip-flop suitable for starting a control sequence for an individual frame.

A prememory flip-flop can have a clock input (T) connected to the time delay circuit and a start control connection can connect the output of the output memory flip-flop to the time delay circuit for providing after a delay time for setting the circuit again for advance operation after a decoupling of the claw mechanism. A stop switch connecting circuit can be provided for switching on the start control connection only after release of the stop switch.

A time delay circuit can be connected to the control input (D) of an advance memory flip-flop and a start control connection can connect the output of the output memory flip-flop to the time delay circuit for providing after a delay time for setting the circuit again for advance operation after a decoupling of the claw mechanism. A stop switch connecting circuit can be provided for switching on the start control connection only after release of the stop switch.

The present invention also provides a method for controlling the motion of a motion picture film which comprises rotating a rotary shutter having a shutter sector, transporting the film with a claw film transport mechanism while the shutter sector blocks a film gate, generating a position pulse corresponding to the position of the shutter sector and said pulse corresponding with respect to time and phase to the claw pull down mechanism of the film moving in film advance direction and feeding the position pulses continuously to a control circuit for an electromagnet. Signals from possibly operator controlled function switches can be fed to the control circuit comprising at least a multivibrator. A position pulse following a signal from a switch is stored in the multivibrator and the electromagnet is energized or respectively deenergized at the end of the claw pull down phase of the claw mechanism.

The rotary shutter can be employed for interrupting a light beam in order to generate a signal corresponding to the position of the shutter sector. The light beam can be deflected at certain positions of the rotary shutter. A path-folding of the light beam can be provided such that the light beam is directed parallel to the axis of the rotary shutter and this can be achieved by attaching a second mirror to the shutter. The interrupted light beam can be sensed with an optoelectronic converter. A register pin forming part of the claw mechanism can be inserted into the film perforation for transporting the film. The position and motion of the register pin can be controlled with an electromagnet. The multivibrator can be a memory flip-flop having a set and a clock input.

A pulse edge of a position pulse following to a function switch signal and occuring about the beginning of the claw pull down phase can be fed to a memory flip-flop via its clock input for providing an intermediate storage of the corresponding function switch signal. Then the corresponding function switch signal is stored at the next following position pulse edge at the end of the claw pull down phase into the output memory flip-flop.

A signal from an advance switch can be fed to the control input (D) of an advance memory flip-flop. A position pulse can be fed to the clock input (T) of the advance memory flip-flop which responds only to the pulse edge at the end of the claw pull down phase. A signal from the output (Q) of the advance memory flip-flop can be fed to the set input (S) of the output memory flip-flop. A signal from a stop switch can be fed to the control input (D) of an intermediate memory flip-flop. The position pulse signal can be fed to the clock input (T) of the intermediate memory flip-flop, which responds only to the pulse edge at the beginning of the claw pull down phase. The output (Q) of the intermediate memory flip-flop can be fed via a control line to the reset input (R) of the advance memory flip-flop.

The set input (S) and the reset input (R) of the intermediate memory flip-flop can be maintained at ground potential. The output of a following memory flip-flop can be fed to the reset input of a preceding memory flip-flop, where the following memory flip-flop is controllable by the preceding memory flip-flop. The output of a following memory flip-flop can alternatively be fed to the clear input of a preceding memory flip-flop, where the following memory flip-flop is controllable by the preceding memory flip-flop.

The individual memory flip-flop can be forced into a set position upon individual frame operation. The output (Q) of the individual frame memory flip-flop can be fed to the control input (D) of the output memory flip-flop. The output (Q) of the output memory flip-flop can be fed to the reset input (R) of the individual frame memory flip-flop. The output of the intermediate memory flip-flop can be fed via a control conduit to the clock input (T) of the individual frame memory flip-flop. The necessary reset position of the advance memory flip-flop and the necessary set position of the output memory flip-flop can be lifted upon actuation of the stop switch. The individual frame memory flip-flop can be set with the leading edge of the position pulse at the beginning of the claw pull down phase upon renewed actuation of the stop switch now acting as an individual frame advance switch after passing of at least one position pulse. The output memory flip-flop can be maintained in set position for a position pulse period starting with the trailing edge of the position pulse.

The individual memory flip-flop can be maintained with a disconnected control input or with a control input connected to a constant control potential.

Sensing markings on the film can further be sensed with a sensing device. Control signals can be generated depending on the markings sensed and the marking control signals can be fed to the control input (D) of a frame marking memory flip-flop. The output (Q) of the frame marking memory flip-flop can be fed to the reset input (R) of the advance memory flip-flop. The inverter output ($\bar{Q}$) of the advance memory flip-flop can be fed to the reset input (R) of the frame marking memory flip-flop. The clock input (T) of the frame marking memory flip-flop can be controlled with the pulse edge of the position pulse at the beginning of the claw pull down phase. Preferably, the edges of the pulses control memory flip-flops which are D-flip-flops. The sensing device can comprise a light beam being measured or sensed after passing through part of the film. The light beam modified by the transmission properties of the film in the area where markings are to be positioned is converted with an optoelectronic converter. The light beam coming from a light source can be guided with an optical guide in the area between the light source, which is preferably a lightemitting diode, and the film. The signal from the stop switch can be fed to the intermediate memory flip-flop via a clear control conduit to the preceding intermediate prememory.

The signal from the advance switch can be fed to the advance memory flip-flop via an advance prememory. The output (Q) of the advance memory flip-flop can be fed to the preceding advance prememory via a clear control conduit. The signal from the marking signal generator can be fed to the frame marking flip-flop via a marking prememory. The output (Q) from the marking memory flip-flop can be fed via a clear control conduit to the preceding marking memory.

A switch signal from a reverse run switch can be fed to a reverse (run) memory, which necessarily resets any functional memory flip-flops and provides for decoupling of the claw mechanism by way of the electromagnet during a reverse run. A reverse stop memory can be switched on to the reverse memory being erasable upon actuation of a stop key. All necessary resets of any functional memory flip-flops can be lifted after clearing of the reverse memory. A delay chain or a counting chain can be switched on with the reverse stop memory in connection with a control pulse generated upon actuation of the stop switch. A control pulse can be fed to the control input (D) of an intermediate memory flip-flop via a corresponding control conduit from an output pulse of the delay chain or the counting chain, which in all other modes of operation and functioning is in a reset position after passing of a delay time, whereby the control sequence in started for an individual frame.

A start control signal can be fed from the output of an output memory flip-flop to a time delay circuit and the delayed signal can be fed from the time delay circuit to the clock input of a prememory flip-flop, whereby after passing of the delay time span the control circuit is again switched to advance operation after the decoupling of the claw mechanism corresponding to a proper frame position based on a light marking pulse or based on actuation of a stop switch.

A start control signal can be fed from the output of an output memory flip-flop to a time delay circuit. A delayed signal can be fed from the time delay circuit to the control input of an advance memory flip-flop, whereby after passing of the delay time span the control circuit is again switched to advance operation after the decoupling of the claw mechanism corresponding to a proper frame position based on a light marking pulse or based on actuation of a stop switch. The start control circuit can be switchable into on position only upon release of a stop switch, which start control circuit comprises a connecting circuit.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawings, in which are shown several of the various possible embodiments of the present invention.

DESCRIPTION OF INVENTION AND PREFERRED EMBODIMENTS

Figure 1:
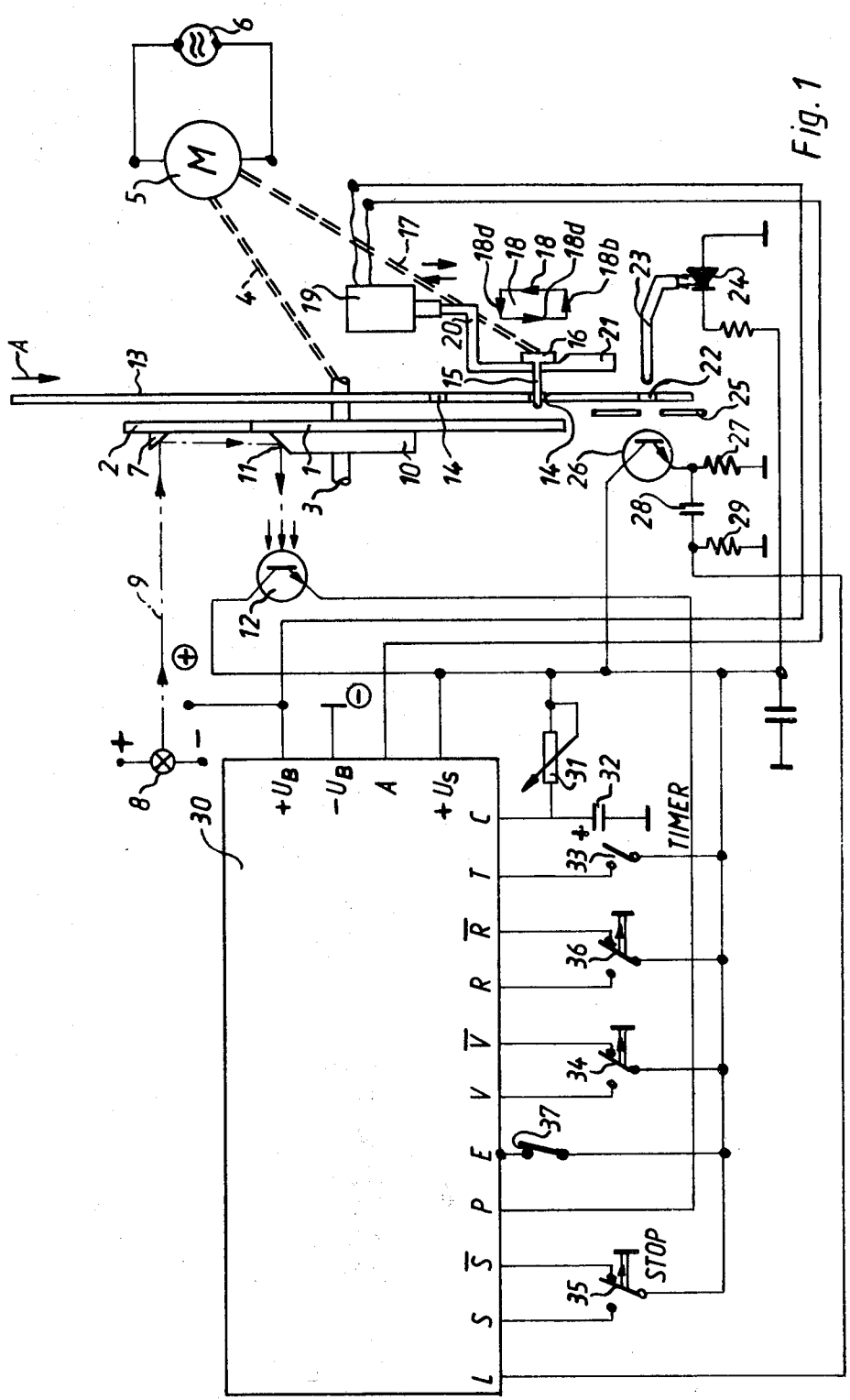
FIG. 1 is a view of a schematic diagram of a motion picture projector incorporating an integrated circuit for controlling the course of motion in the projection apparatus as well as the peripheral parts connected to the same.

In accordance with the invention there is provided a motion picture apparatus and preferably a motion picture projector having a rotary shutter driven by an electrical drive provision, a claw mechanism for the film transport controlled by the elctrical drive, where the claw mechanism during the blocking phase of the film gate by way of a shutter sector advances the film frame by frame. The claw mechanism can be coupled in and can be decoupled from the film by way of a solenoid plunger adapted to an electromagnet.

The rotary shutter is provided with control means for a pulse generator, which control means are such disposed at the rotary shutter that its pulses with respect to their duration and phase correspond in each case with the claw pull down phase in the direction of film advance and that they as position pulses are continuously fed to a control circuit for the electromagnet. The control circuit is connected to functional switches such as for example an advance switch or a stop switch and is provided with clock inputs, set inputs and/or reset inputs being part of memory flip-flops. The control signal of at least one function control switch is fed to at least one memory multivibtrator. The control signal is by way of the pulse edge at the end of the claw pull down phase of a position pulse following to the control signal stored via set input or clock input at least in the output memory flip-flop cooperating with the electromagnet for energizing or deenergizing position properly the electromagnet at the end of a claw pull down phase of the claw mechanism.

This way advantageously an electronic standstill of the film is achieved without the requirement of complex mechanical control means or control curves. By way of the reliable decoupling of the claw mechanism from the film with the aid of the solenoid at the end of the claw pull down phase there is assured that the coupling and decoupling process can be performed with certainty. The proper position electronic coupling and decoupling of the solenoid system and performed synchronously with the position pulses for the film is not only applicable upon operation of the circuit system in an advance or stop operation, but also in connection with reverse run operation, with individual frame advance operation, in timer operation, which refers to projection of standing pictures with preset time intervals, as well as in a stop operation based on frame markings provided on the film. The present invention thus results in a gentle and easy coupling and decoupling of the claw mechanism with the film.

Reference is made to copending application to Motion Picture Apparatus where additional details and features are shown useful in connection with the present invention and the disclosure of said copending application is hereby incorporated in the present application by reference.

For example in a further feature for reducing the load of the memory flip-flops cycled with the named pulse edge and for increasing the reliability at least one of the cycled memory flip-flops can be flipped via its clock input by way of the pulse edge occuring at the start of the claw pull down phase of a position signal following to the function switch signal in the way of an intermediate storing of the corresponding function signal, where the corresponding function signal is stored in the output memory flip-flop at the next following pulse edge at the end of the claw pull down phase of the position pulse.

In accordance with another feature of the present invention an advance key is connected to the control input of an advance memory flip-flop, the clock input of which is provided with a control conduit for the position signal input and which can only be influenced by a pulse edge at the end of the claw pull down phase, where the output of the advance memory flip-flop is connected to the set input of the output memory flip-flop, where the stop switch is connected to the control input of an intermediate memory flip-flop, the clock input of which is provided with a control line to the position signal input and which can only be influenced by the pulse edge at the start of the claw pull down phase and where the output of the intermediate memory flip-flop is provided with a control line to the reset input of the advance memory flip-flop.

In addition, the stop switch is also to be employed for individual frame reproduction operation. Advantageously, for this purpose an individual frame memory flip-flop which is necessarily reset during advance operation coordinated to the output memory flip-flop. The output of the individual frame memory flip-flop is connected to the control input of the output memory flip-flop and the reset input of the individual frame memory flip-flop is connected to the output of the output memory flip-flop, where the clock input of the individual frame memory flip-flop is provided with a control conduit to the output of the intermediate memory flip-flop. Upon actuation of the stop switch the necessary reset of the advance memory flip-flop and the necessary setting of the output memory flip-flop are lifted, where upon renewed actuation of the now as individual frame advance switch acting stop switch the individual frame memory flip-flop is set after passing of at least one position pulse with the leading edge at the beginning of the claw pull down of the position pulse and the output memory flip-flop remains set for a position pulse period beginning with the trailing edge of the position pulse.

In an advantageous embodiment the individual frame memory flip-flop is provided with a control input not connected to a circuit or connected to a constant control potential.

It is particularly advantageous to employ the control circuit for responding to markings of the film and to evaluate these markings via a corresponding recognition circuit. For this purpose a control conduit is connected with the control input of a frame marking memory flip-flop for the film making pulses. The output of the frame marking memory flip-flop is connected to the reset input of the advance memory flip-flop and the reset input of the frame marking memory flip-flop is connected to the inverted output of the advance memory flip-flop, where the clock input of the frame marking memory flip-flop is controlled by the pulse edge at the start of the claw pull down phase of the position pulse.

Advantageously, the memory flip-flops are edge controlled D-flip-flops. Also, the intermediate memory flip-flop is connected to ground with its reset and set input.

In order to achieve that the memory flip-flops are cleared only when the following memory flip-flop have received their signal, the following memory flip-flops controlled by the peceding memory flip-flops are provided with control conduits from the output of the following memory flip-flop to the reset input or respectively the clear input of the preceding memory flip-flops.

In order to store the actuations of the control switches performed asynchronously to the frame marking pulses a prememory is provided between the stop input and the intermediate memory flip-flop, between the advance input and the advance memory flip-flop and between the frame marking memory flip-flop and the frame marking signal input.

In order to clear the prememories after passing on of the control signals, the output of the intermediate memory flip-flop or respectively the advance memory flip-flop or respectively the frame marking memory flip-flop are provided in each case with a clear control conduit to the prememory prepositioned in each case.

In order to employ the control circuit also for reverse run operation there is provided a reverse run switch, which is followed by a reverse run memory, by which all memory flip-flops are necessarily reset, whereby the claw mechanism is decoupled through the electromagnet in reverse run operation.

In order to achieve a position proper standstill of the film also upon stop from a reverse run, a reverse run stop memory follows to the reverse memory clearable upon actuation of the stop switch key, where after the clearing of the reverse run memory all necessary resets of the memory flip-flops are lifted. Therewith the reverse stop memory in connection with the control pulse upon actuation of the stop key switches on a delay chain or a counting chain, where upon passing of a delay time, which is adapted to the time for bringing the reverse run motor to standstill, the control input of the intermediate memory flip-flop receives a control pulse from the output pulse of the counting chain, which is reset upon all other operation or respectively function modes of the control circuit by necessity, via a corresponding control conduit, whereby a control sequence for an individual frame is started.

In order to employ the control circuit also for timer mode of operation, a time delay circuit is provided in a preferred embodiment of the present invention, which is provided with a control conduit to the control input of the advance memory flip-flop or to the clock input of the advance prememory, where from the output of the output memory flip-flop a start control connection is provided for a time delay circuit, whereby for example after the proper frame position decoupling of the claw mechanism the switching circuit is again switched to advance mode of operation based on a light marking pulse or based on actuation of a stop switch after passing of the delay time interval. In this case a connecting circuit is provided at the start control connection, which switches the start control connection on only after release of the stop switch.

Referring now to FIG. 1 there is designated with 1 a rotary shutter which is provided with three rotary blades or rotary sectors 2 staggered by 120°. The rotary shutter can be rotated around an axis 3 and is connected via drive means 4 to a drive motor 5, which is energized by an ac-power source 6. A deflection mirror 7 is provided at a shutter sector 2, which mirror deflects the light beam 9 coming from a light source 8 into the direction toward the axis 3. At the shoulder 10 disposed at the rotary shutter there is provided another deflection mirror 11, which deflects the beam of light 9 toward a phototransistor 12.

The film is designated as 13 and comprises a perforation of sprocket holes 14. A register pin 15 of a claw lever 16 engages the perforation holes 14. The claw lever is connected to the drive motor 5 through a drive cam connection 17 having a cam path.

The claw lever 16 with the register pin 15 performs a claw motion 18. During the phase 18a the register pin 15 is inserted into the perforation 14 and moves the film by the length of a frame in the direction of arrow A. During the motion phase 18b the register pin 15 is lifted out of the perforation 14. During the phase 18c the backward motion of the claw lever is performed, which during the phase 18d is again inserted into the perforation 14.

An electromagnet is designated as 19 and the electromagnet is provided with an attachment or protrusion 21. In the fallen down state the attachment 21 occupies the position shown in FIG. 1. In the attracted state of the solenoid plunger 20 the attachment 21 is moved in a direction parallel to the film plane 13 and opposite to the direction of arrow A. Under these conditions the drive 5 remains in engaged connection with the claw lever 16 via the control connection 17. The pin 15 of the claw lever 16 however cannot engage the next following perforation 14, since the attachment 21 prevents an insertion of the pin 15.

At the level of the perforation holes 14 the film is provided on the opposite side at certain positions with markings 22, which are to effect an automatic placing in standstill of the film. At a defined distance from the film gate not shown there is a light guide 23, the free end of which is disposed in front of a frame marking. The other free end of the light guide rod 23 is disposed in front of a light emitting diode 24. On the other side of the film 13 there is provided a screen 25 behind which a phototransistor 26 is disposed. An emitter resistor of the phototransistor 26 is designated as 27. A connection leads from the emitter to a capacitor 28 and to a resistor 29. Both elements form a differential element.

The position of the mirrors 7 and 11 and their width are coordinated to the form of the cam path curves of the drive connection 17 between the motor 5 and the claw mechanism 15,16 such that a light pulse transfer to the phototransistor 12 is performed only during the pull down phase of the claw mechanism 15,16. This results in the advantage, that the leading edge or respectively the trailing edge of the light pulse or respectively the light pulse duration provide an accurate information about the position of the claw mechanism 15, 16 in each case and therefor can be employed for evaluation to provide a proper position placing into standstill of the film.

An integrated circuit is designated as 30 having an input $+U_B$ connected to the plus pole of a supply voltage source. A further connection position $-U_B$ is connected to the negative pole of the voltage source. The output A of the control circuit 30 is connected to the electromagnet 19 and its remaining connection is made with the plus pole of the battery. A connection point of the control circuit 30 is designated as $U_S$, at which a regulated constant voltage is applied. This constant voltage is generated in the control circuit 30. A first connection from the connection point $U_S$ is made to the collector of the phototransistor 12, the emitter of which is connected to the input P of the control circuit 30. The light pulses received by the phototransistor 12 are transferred as electrical signals to the input P of the control circuit 30. In addition, a connection leads from the output $U_S$ to the phototransistor 26. From the connection point between the capacitor 28 and the resistor 29 there is provided a control connection to the input L of the control circuit 30. This control connection is also designated as light marking connection.

The input C of the control circuit 30 is connected to a resistor 31 and to a capacitor 32. The two elements provide a time member for the timer function of the projection apparatus. The timer effects, that the film remains stationary after being placed into standstill for a certain time in order to be thereafter continued to be transported. The timer is switched on by way of a switch 33, which provides the potential of the output $U_S$ to the input T of the control circuit.

An advance switch is designated as 34, which is provided as a double-throw switch and which coacts with two inputs V and $\overline{V}$ of the control circuit 30.

A stop and individual frame switch is designated as 35 which cooperates with the inputs S and $\overline{S}$ of the control circuit 30.

The control circuit is constructed with integrated injection logic I²L-technique. This is an integrated injection logic as a digital circuit technique. The injection technique is characterized by small crystal surfaces and a low loss power. In addition only short signal delays are present.

The control circuit 30 comprises the memory flip-flops (D-flip-flops) SP1 to SP10, NAND-gates G1 to G53, transistors T1 to T36 and resistors R1 to R40. In the D-flip-flops the output Q takes data input value when control goes to 1 and it can act as a binary sample hold circuit. The NAND-gates G1 to G53 shown in FIGS. 2a to 2h are in this representation most appropriate for the I²L-technique. In each case a single input is present. The inversion is shown at the input side. However, it also can be represented at the output. The numerous outputs are decoupled from each other. They can have various potentials based on outside imposition. An output providing a potential logical "1" can for example be connected to an output of another gate having the output logical "0" without that thereby a short circuit is generated. In this case the output having properly the potential logical "1" of the one gate would adopt the potential logical "0" of the output of the other gate.

Two NOR-gates are designated as G35 and G51, which are shown in conventional fashion.

The connection points for the connecting conduit of the control circuit 30 are designated as A1 to A39 according to FIGS. 2a to 2h.

In the following there is described initially the control circuit 30 with its individual elements in its coaction with the peripheral parts at the switch on phase of the voltage to the point of reaching full operational capacity.

Upon application of a voltage between the connection points $+U_B$ and $-U_B$ there is initially provided an activation of the transistors T12 to T15 (FIG. 2h), which in cooperation with the resistors R36, R39 and R40 (FIG. 2h) generate the stabilized voltage $U_S$. This voltage is available for the complete switching logic of the control circuit 30.

During the first phase of the voltage rise of the stabilizing voltage $U_S$ the transistor T8 (FIG. 2e) is blocked, since the voltage at its base is insufficient for full operation, and this voltage is determined by the voltage divider R15, R16 less the flow voltage of the transistor T9 (FIG. 2f) connected as a diode. The injector of the gate G25 (FIG. 2e) is initially at a logical "1", such that its three outputs show zero potential.

Figure 2A:
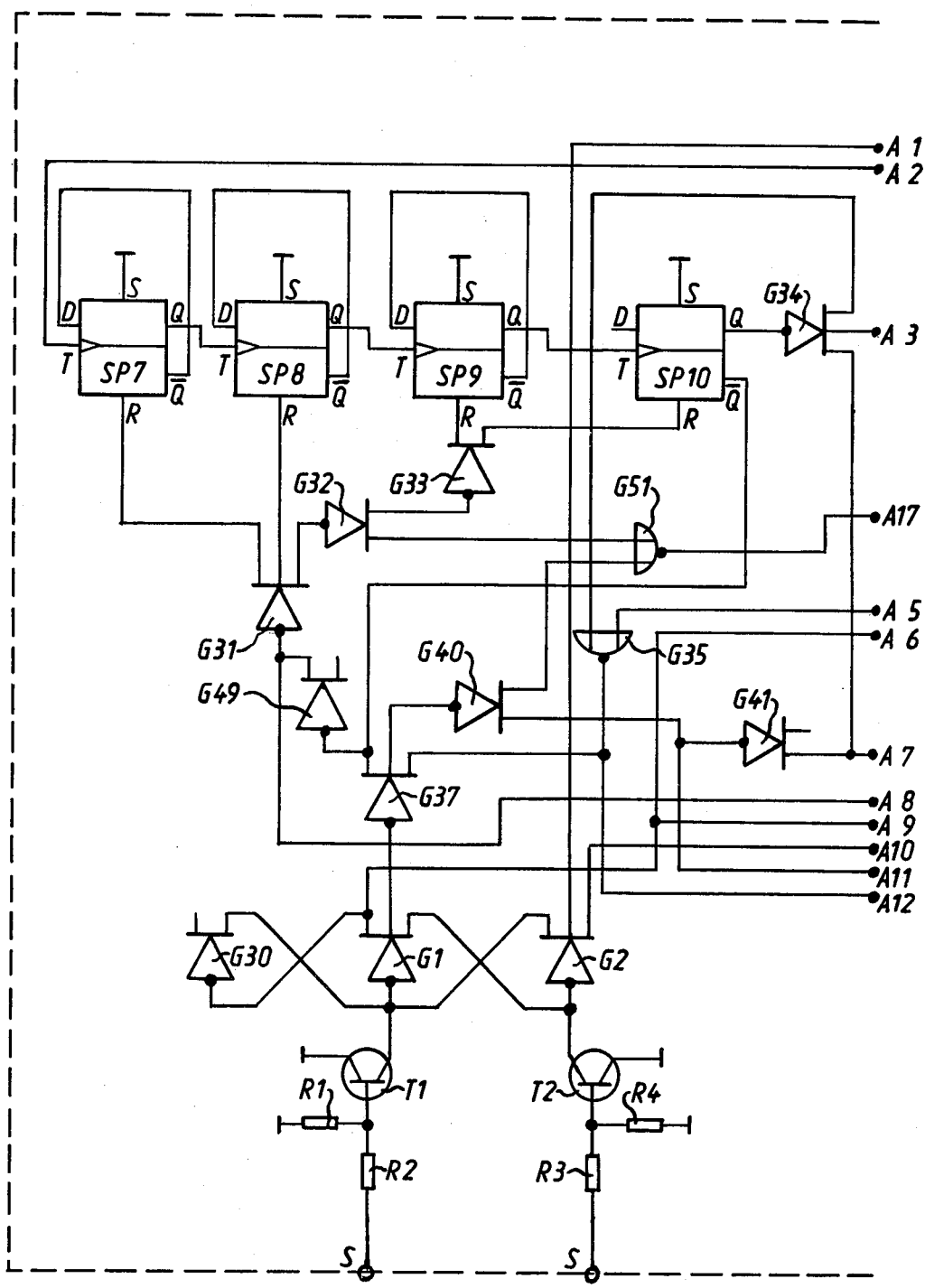
FIGS. 2a to 2h are parts of a view of an integrated control circuit based on $I^2L$ (integrated injection logic) technique.

One of these outputs is connected to one of the outputs of the gate 21 (FIG. 2e) as well as to one of the three outputs of the gate G2 (FIG. 2a). A further connection runs from the output of the gate G25 (FIG. 2e) to the input of gate G20 (FIG. 2e), the output of which becomes a logical "1". Upon non-closed reverse switch 36 (open connection to the input R) zero potential is applied to the base of the transistor T21 (FIG. 2d), while at the basis of the transistor T22 (FIG. 2d) is applied the potential "1". A memory formed by the gates G38 and G39 (FIG. 2d) is switched such that the output of gate G39 is at a logical "1" level. This allows for the signal "1" coming from the gate G20 (FIG. 2e) to become effective at the input of the gate G21. The outputs of the gate G21 become logically "0". From this follows, that the memory comprising gates G20 and G21 (FIG. 2e) is placed in a preferred position, which also then remains, when the outputs of the gate G25 (FIG. 2e) become logical "1". One of the outputs of the gate G21 is provided with a connection to the input of the gate G22. One of the outputs of gate G22 is provided with a connection to the memory G44, G45 (FIG. 2d). The potential logical "1" is applied to the gate G45. However, this has no effect. The signal logical "0" passes from gate G25 (FIG. 2e) via gate G46 (FIG. 2e) and gate G47 (FIG. 2e) to the gate G44 (FIG. 2d) of the memory G44, G45. This zero signal places the memory in its preferred position. The gates G46 and G47 (FIG. 2e) are provided for the expansion of the number of output collectors of the gate G25 (FIG. 2e).

The two additional outputs of the gate G22 (FIG. 2e) tend to accept the potential logical "1". Both outputs, however, are initially kept by gate G47 (FIG. 2e) at the level logical "0". The outputs of the gate G23 (FIG. 2e) show the potential logical "1". The same potential is applied to the output of gate G9 (FIG. 2b), which is connected to the reset input of an individual frame memory flip-flop SP1. This individual frame memory flip-flop SP1 is reset via gate G25.

In addition, the potential logical "1" passes from the output of the gate G23 directly to the reset input R of an output memory flip-flop SP2. In addition, the potential logical "1" passes via the gates G31, G32 and G33 (FIG. 2a) to the reset inputs R of additional memories SP7, SP8, SP9, and SP10 (FIG. 2a). These memories form a delay chain. The potential logical "1" passes in addition via gate G19 (FIG. 2e), G16 (FIG. 2d) to the reset input of an additional advance memory flip-flop SP3 (FIG. 2c) as well as via the gates G19 and G14 (FIG. 2c) to the reset input of an additional memory being prememory flip-flop SP5 (FIG. 2c).

All above mentioned memories are placed in their rest position. An additional memory forming a frame marking memory flip-flop SP4 (FIG. 2e) is reset via the control connection with the output Q of the advance memory flip-flop SP3, which shows the potential logical "1".

The potential logical "1" of the gate G23 (FIG. 2e) is inverted by the gate G19 to logical "0". This way the memory comprising the gates G26 and G27 (FIG. 2e) is placed in its preferred position.

If the voltage $U_R$ reaches about 85 percent of its nominal value, then the transistor T8 (FIG. 2e) becomes conducting. Therefor, the outputs of the gate G25 (FIG. 2e) become logical "1" with the result that all forced direct resets are lifted. An indirect reset of the frame marking memory flip-flop SP4 remains for such time until the advance memory flip-flop SP3 is set and a reset pulse passes from the output $\overline{Q}$ to the reset input of the frame marking memory flip-flop SP4. The circuit is now ready to operate.

Figure 2B:
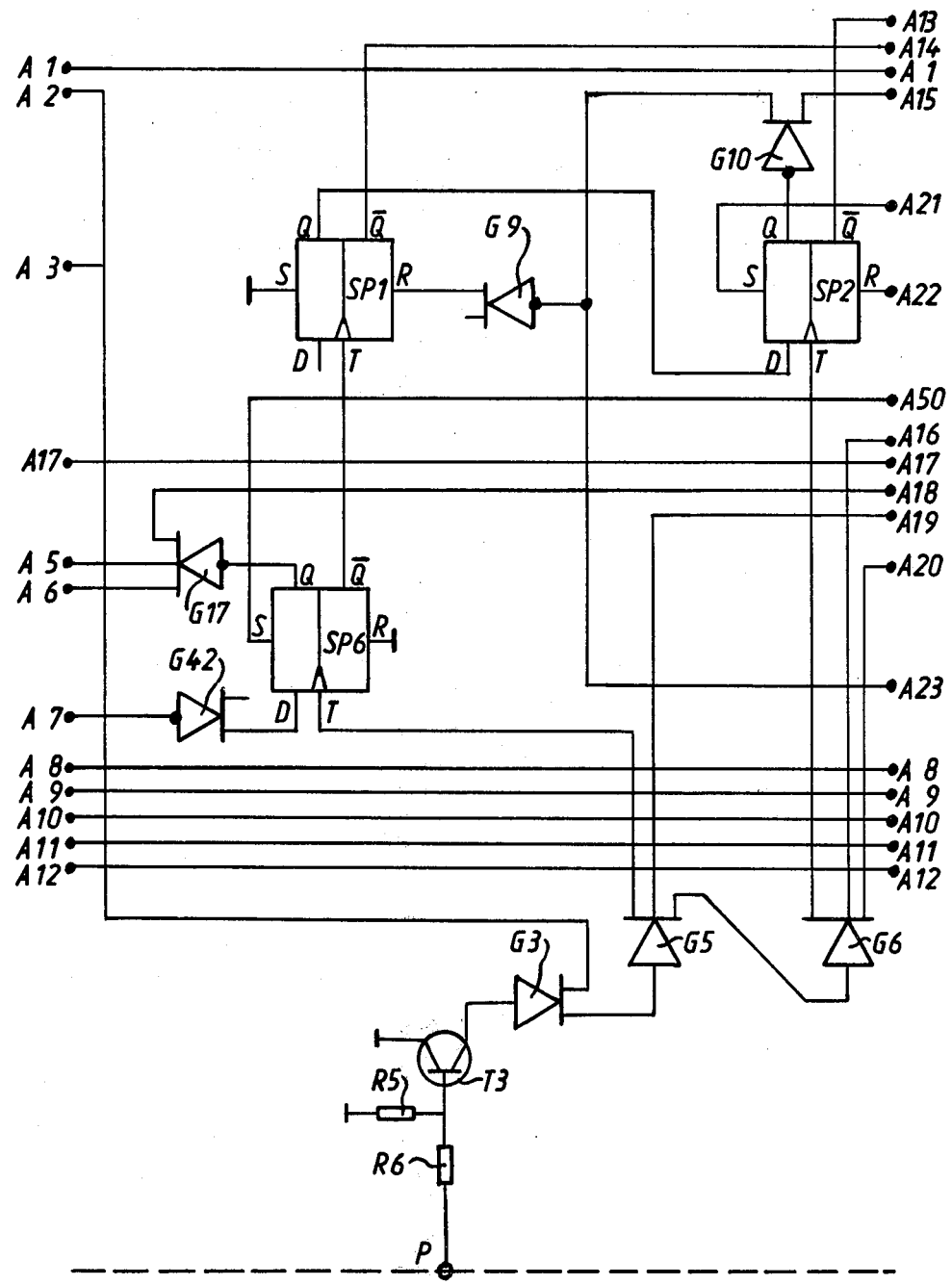
Figure 2C:
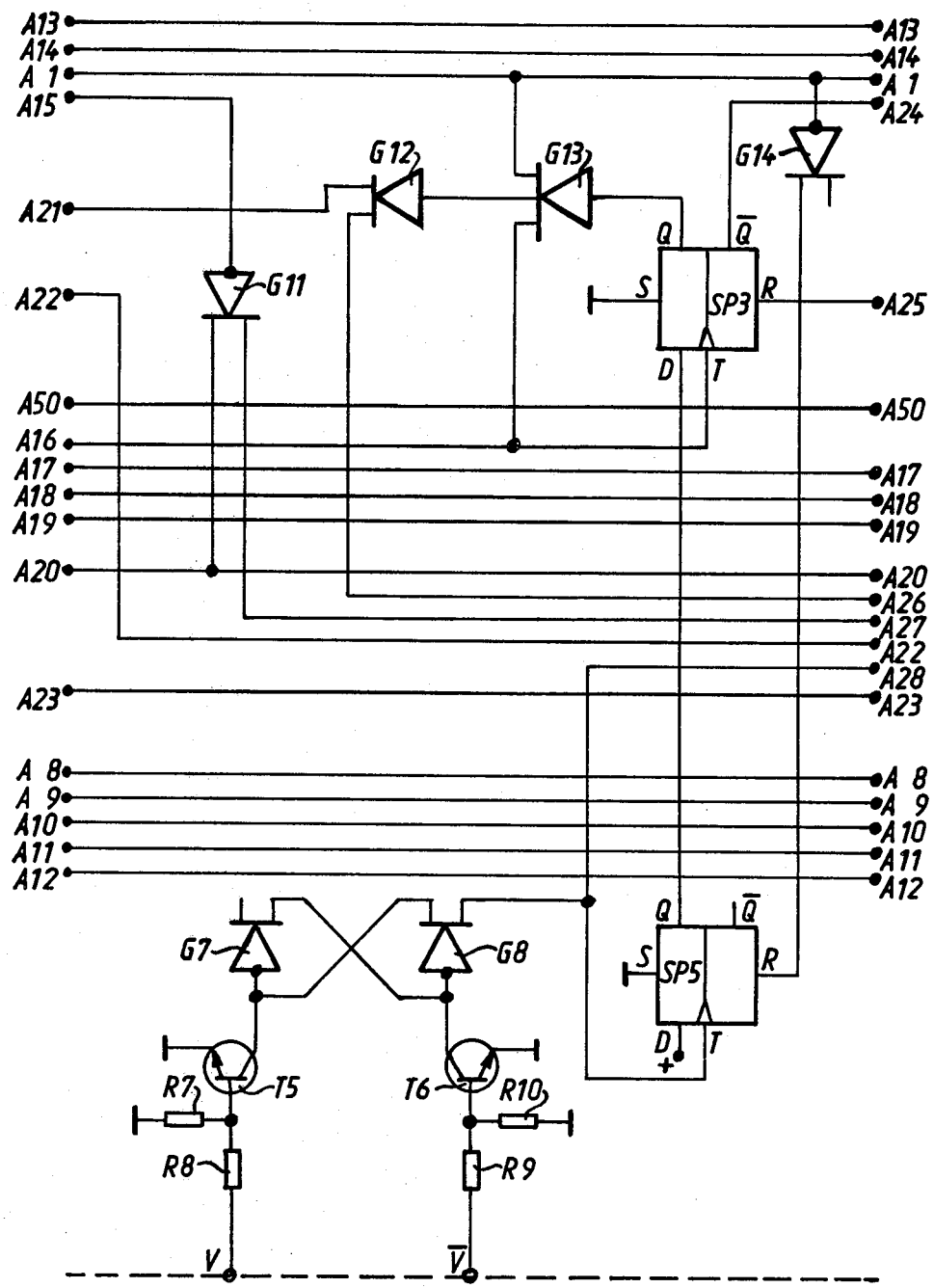
Figure 2D:
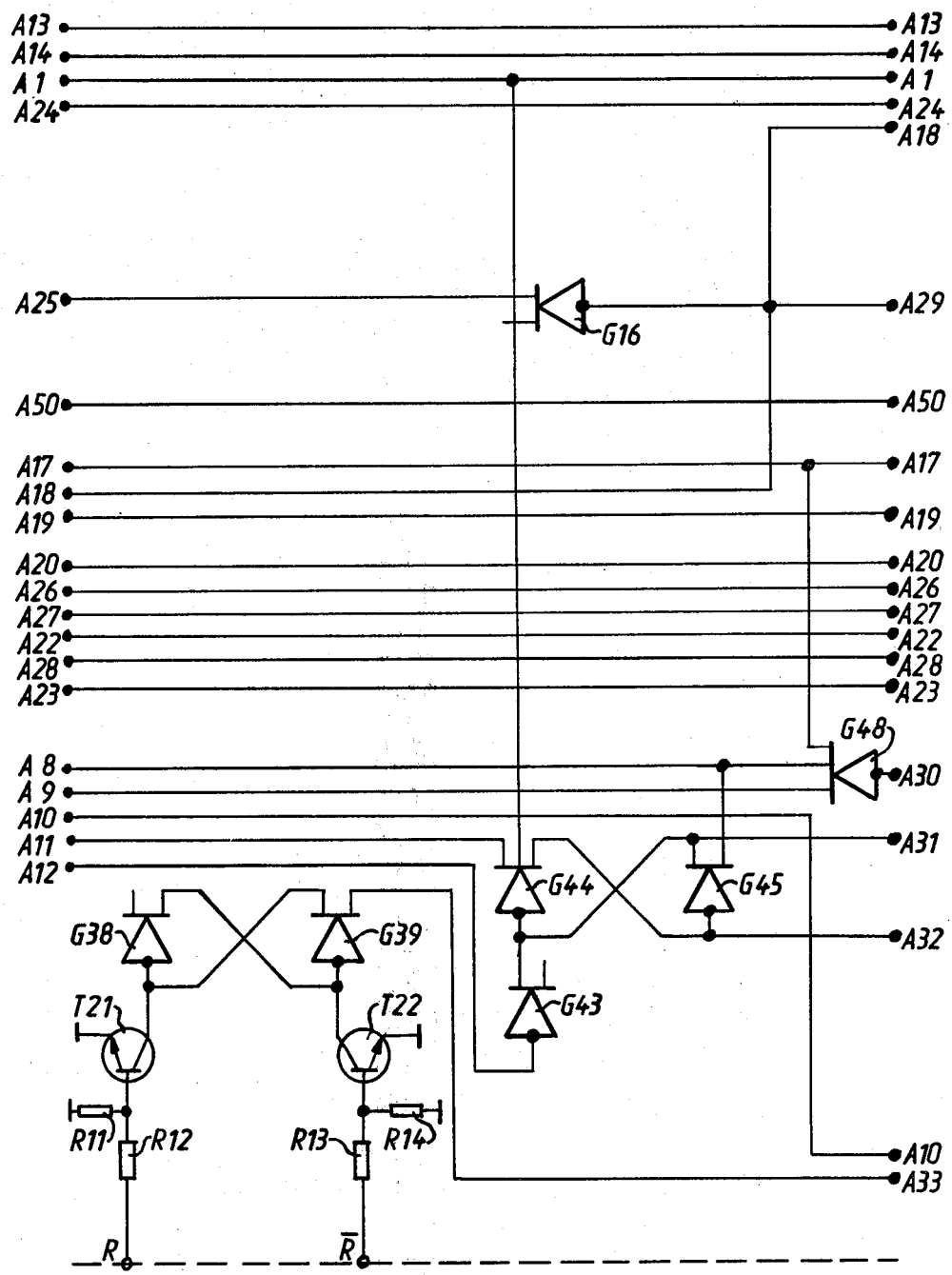
Figure 2E:
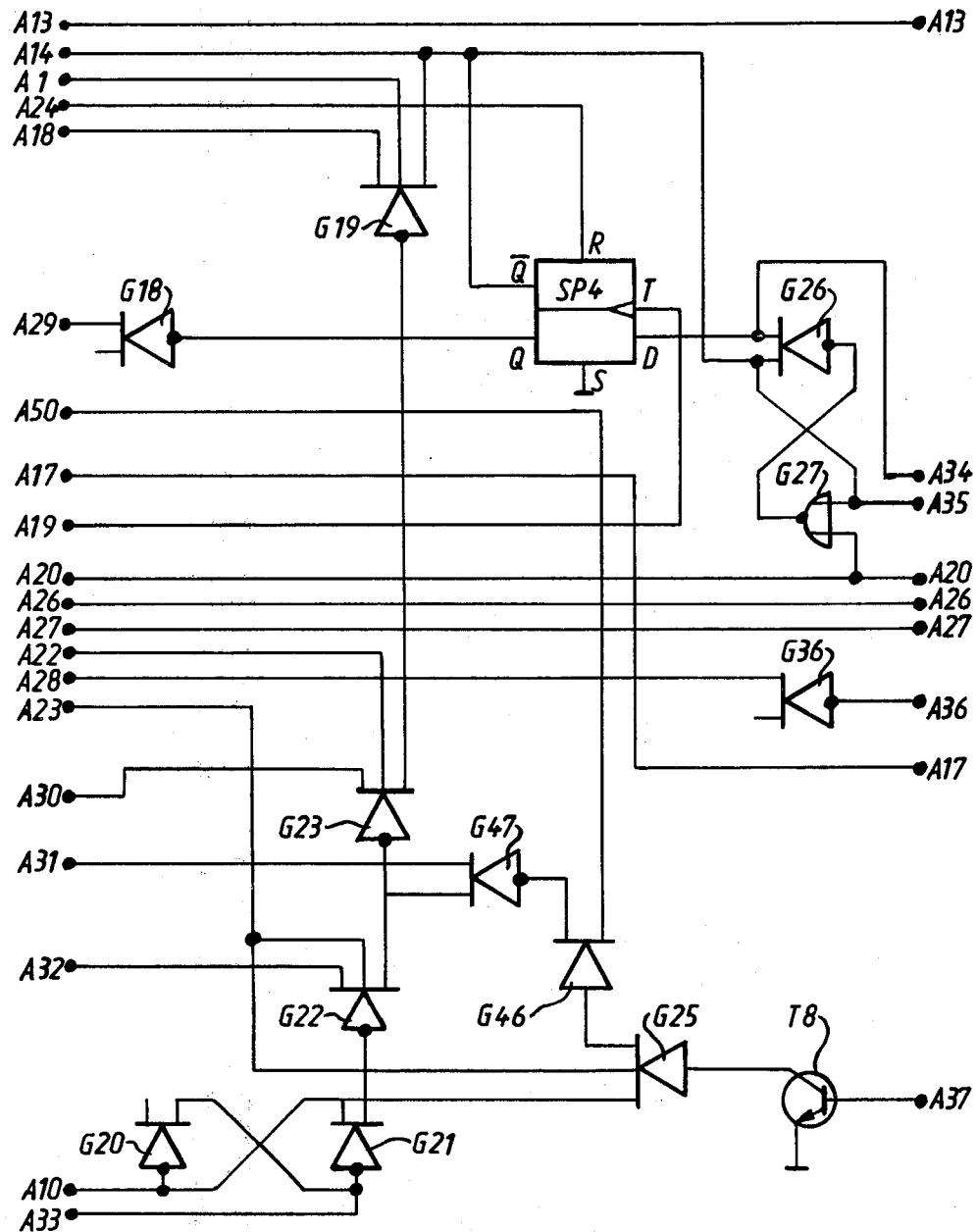
Figure 2F:
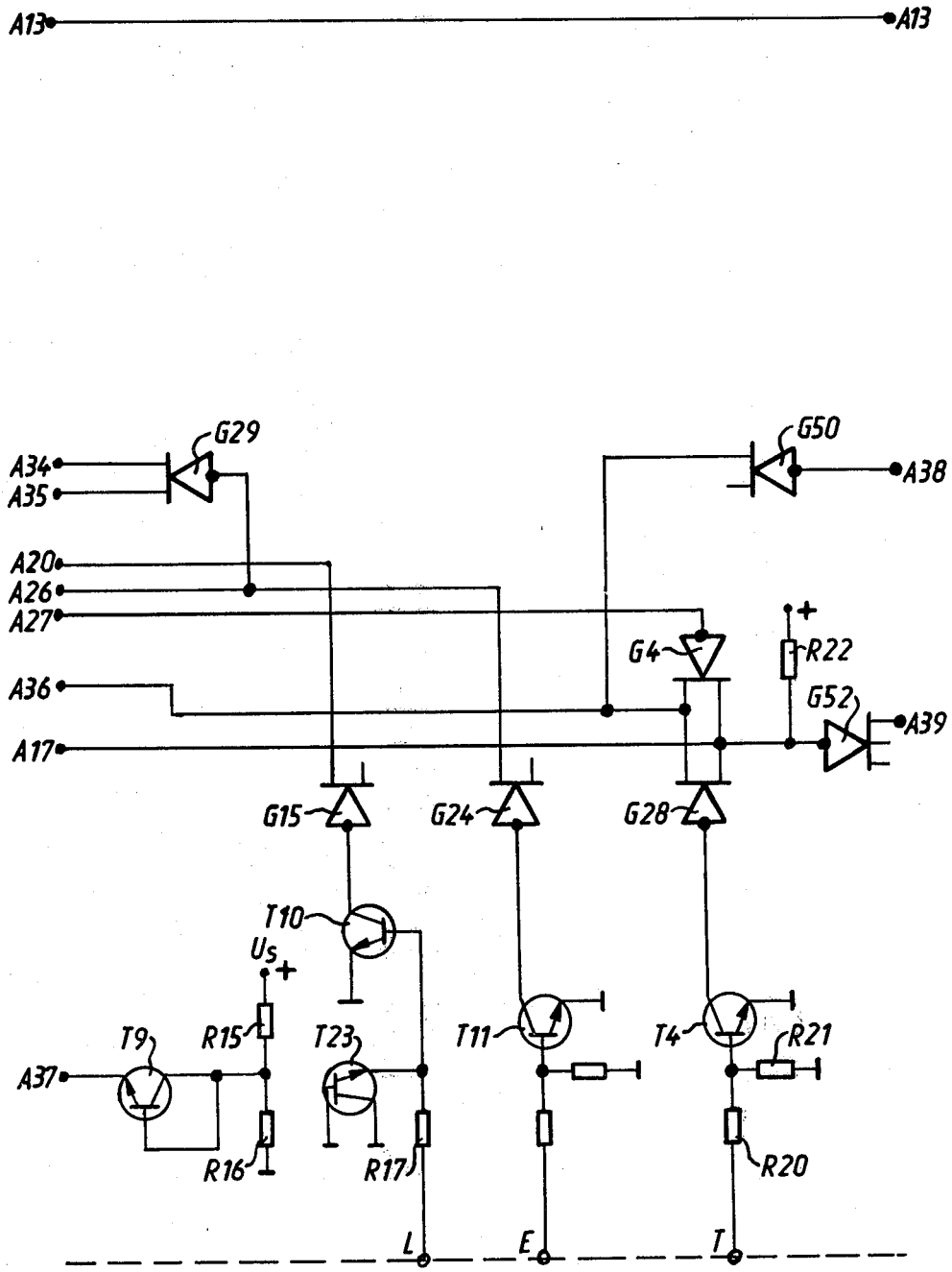
Figure 2G:
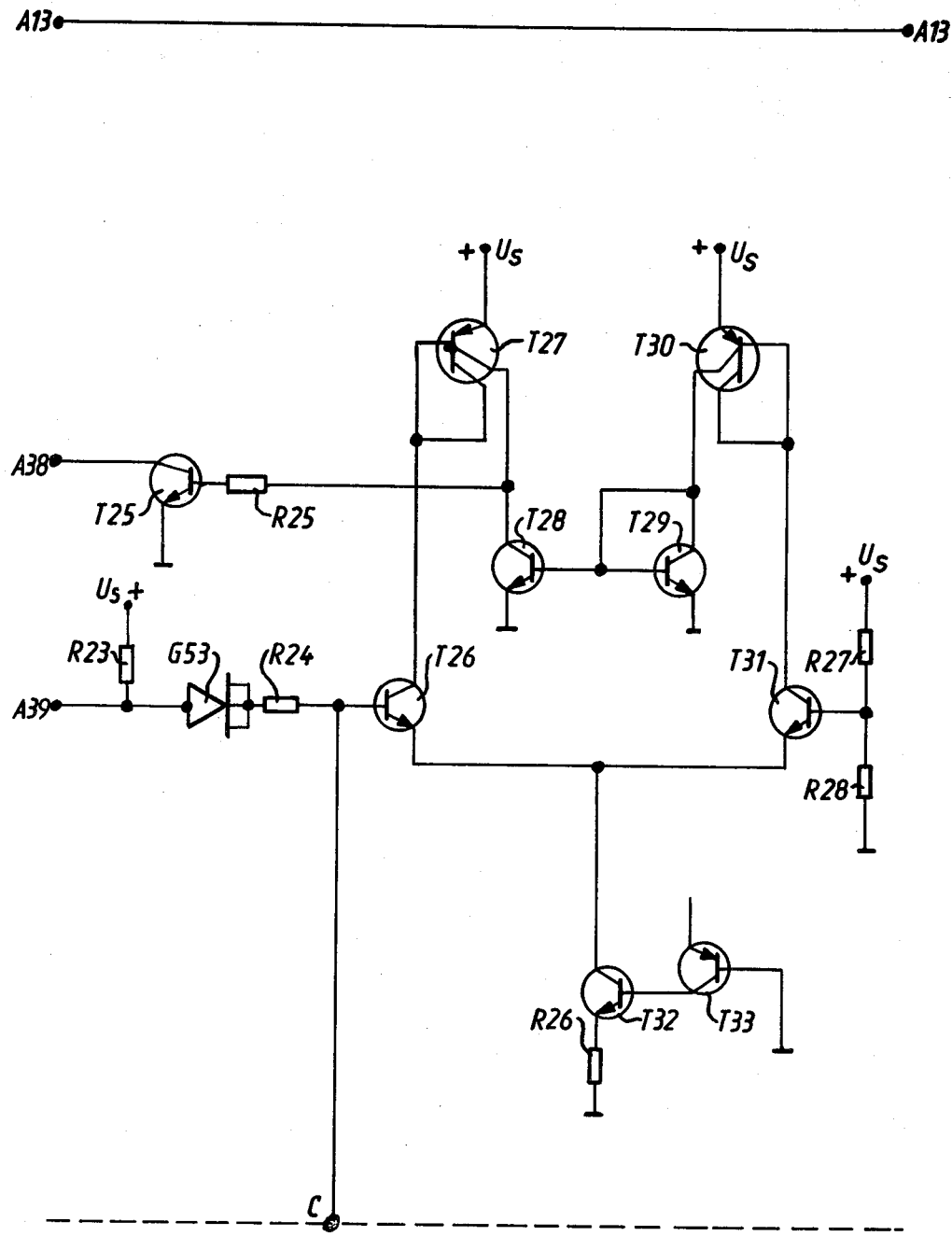
Figure 2H:
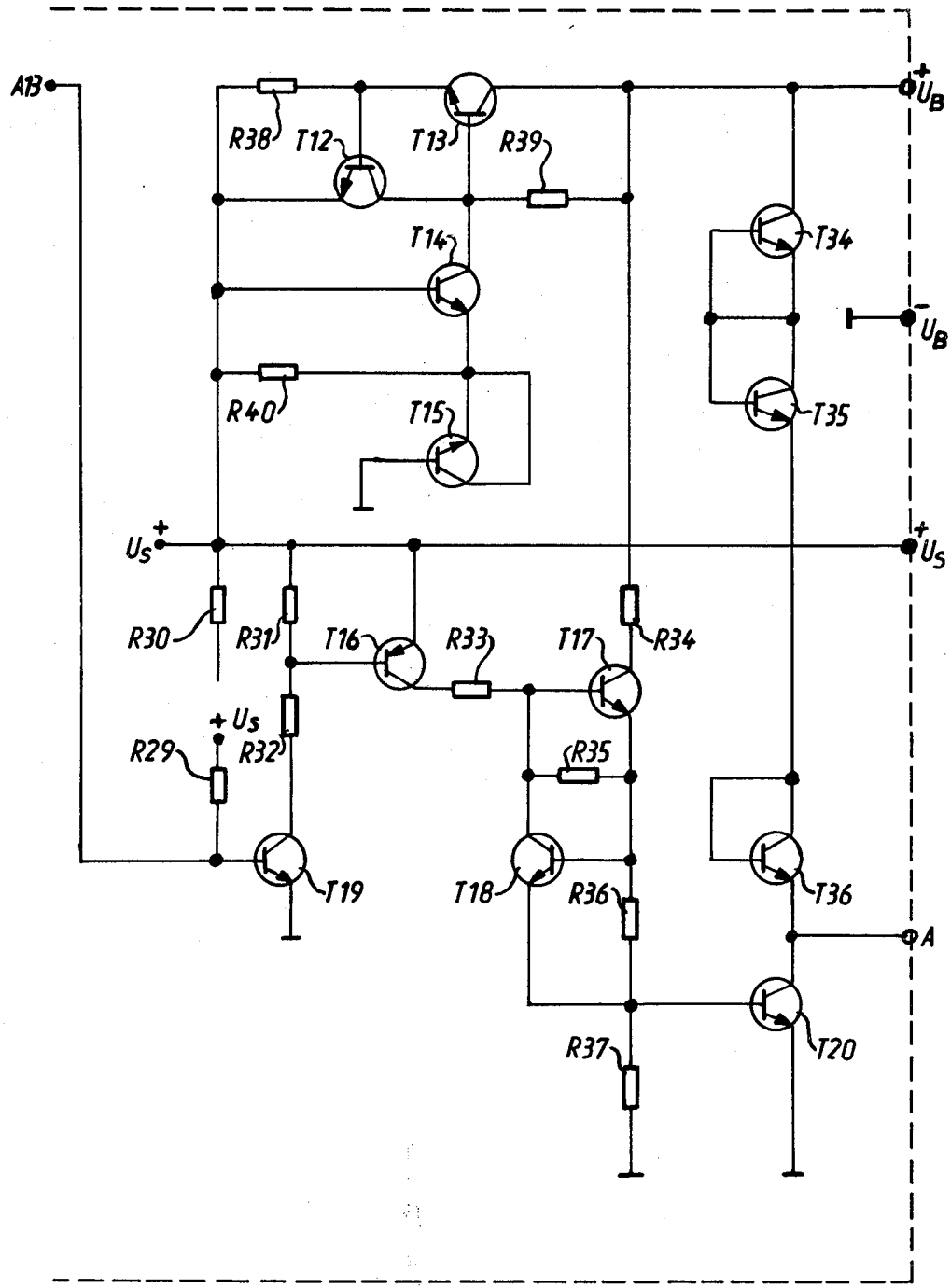

A logical "1" is positioned at the output $\overline{Q}$ of the output memory flip-flop SP2 (FIG. 2b). Tis potential passes via the transistor T19 (FIG. 2h) to the bases of the transistors T16, T17, T18 and T20 (FIG. 2h). The transistor T20 becomes conductive with the result, that the zero potential is applied to the output A.

The magnet 19 connected with this output A is energized with the result, that its plunger 20 is attracted, such that the register pin 15 cannot engage the perforation holes 14.

The mechanical shutter continues to rotate by way of motor 5, while the film 13 is at a standstill. Light pulses are also generated during the standstill of film 13 by way of the optical position sensing device 8, 9, 7, 11, 12, which pulses are applied at the input P of the control circuit 30 as a pulse chain. During the positive pulse phase the film is transported (claw pull down phase 18a), while during the negative pulse phase the film is at rest (stand phase 18b to 18d).

In the following the advance of the motion picture is described by way of the FIGS. 2a to 2h without consideration of light marking recognition.

It is assumed that the light marking recognition is switched off. This means, that a positive signal is standing at the input E (FIG. 2f). This passes via the transistor T11 and the gate G24 to the gate G29 (FIG. 2f). It can only become effective, if also the potential logical "1" of gate G12 (FIG. 2c) is applied.

Now the advance switch 34 is actuated and control potential is applied to the input V of the control circuit 30. The advance switch 34 is debounced via the flip-flop formed by the gates G7 and G8 (FIG. 2c). The output of the gate G8 turns over with its potential from logical "1" to logical "0". This potential jump is passed on to the clock input T of the prememory flip-flop SP5 (FIG. 2c) with the result that the information laying at the input D of the prememory flip-flop SP5 is taken into this flip-flop. The unconnected input D means a potential logically "1". The output Q of this prememory flip-flop SP5 shows the potential logical "1", which is also present at the input D of the advance memory flip-flop SP3.

For synchronizing of the asynchronously performed pressing of the key switch "advance", which is stored in the prememory flip-flop SP5 it is required to wait for the potential change from logical "1" to logical "0" at the clock input T of the advance memory flip-flop SP3 (FIG. 2c). Only when the outputs of the gate G6 (FIG. 2b) experience a potential change from logical "1" to logical "0", then the potential logical "1" present at the input D of the advance memory flip-flop SP3 is accepted into this memory corresponding to the mechanical transition from pull down to standstill phase.

The intermediate storage of the advance signal in the prememory flip-flop SP5 occurs in order to assure that only one transition of the switch 34 from its rest position into its working position is sufficient for controlling the information. In most cases, the actuation of the advance switch 34 is performed asynchronously to the momentary position of the light position pulses and therefor asynchronously to the position of the claw mechanism 15,16. A synchronization is performed with the aid of the prememory flip-flop SP5 such that after a pull down of the claw lever the magnet 19 is deenergized for providing a proper position. During the energized phase the register pin of the claw mechanism is disengaged from the film.

The potential logical "1" picked up into the advance memory flip-flop SP3 passes from the output Q of this memory via the gates G13 and G12 (FIG. 2c) to the set input S of the output memory flip-flop SP2 (FIG. 2b), which is therby set. The potential at the output $\overline{Q}$ of the output memory flip-flop SP2 becomes logically "0". Therby, the transistors T16 to T20 (FIG. 2h) are controlled such that the magnet is deenergized.

Under these conditions the solenoid plunger 20 takes the position shown in FIG. 1. The register pin 15 now performs the motion phase 18b, 18c, 18d and engages in the following pull down phase 18a into the perforation of the film 13 and transports the film further by one frame.

The gates G12 and G13 (FIG. 2c) serve to expand the number of outputs of the advance memory flip-flop SP3 (FIG. 2c). The potential logical "0" of one output of the gate G13 passes to the clock input T of the advance memory flip-flop SP3. This effects that no additional clock pulse can become effective as long as information is present in the advance memory flip-flop SP3. The potential logical "1" passes from the output Q of the advance memory flip-flop SP3 via the gates G13 and G14 (FIG. 2c) to the reset input R of the prememory flip-flop SP5, which flip-flop is reset thereby. This prevents that several actuations of the advance switch key 34 performed during advance motion generate effects in the prememory flip-flop SP5. The information prestored in prememory flip-flop SP5 is cleared again as soon as this information reaches the advance memory flip-flop SP3. This effects in addition that at the input D of the advance memory flip-flop SP3 there is applied the potential logical "0".

If based on a stop command the advance memory flip-flop SP3 is reset, then it is assured that at the next transition of the position switch there is certainly no information applied to the input D of the advance memory flip-flop SP3, since only after the resetting of this advance memory flip-flop SP3 the prememory flip-flop SP5 is again ready for receiving a new advance command.

One output of the gate G12 (FIG. 2c) is connected to the gate G24 (FIG. 2f) and to the input of the gate G29 (FIG. 2f).

Since no light markings from the input L are to be recognized, the output of the gate G29 turns with respect to potential "0" with the result that no light marking information is stored in the memory comprising the gates G26 and G27.

The potential logical "1" at the output Q of the output memory flip-flop SP2 (FIG. 2b) is fed on via the gates G10 (FIG. 2b) and G11 (FIG. 2c) to the input of the gate G27 (FIG. 2e), where it then becomes effective, if the output of the gate G6 has a potential logical "1" (pull down phase of the film) and if the output of the gate G15 (FIG. 2f) shows the potential logical "1" (presence of a light marking). The connection from the gate G29 (FIG. 2f) to the gate G26 (FIG. 2e) and to the input D of the frame marking memory flip-flop SP4 (FIG. 2e) prevents that the input D even only for a short time receives the potential logical "1".

From the output $\overline{Q}$ of the advance memory flip-flop SP3 (FIG. 2c) the potential logical "0" is transferred to the reset input R of the frame marking memory flip-flop SP4 (FIG. 2e) with the result that this memory flip flop SP4 is not any longer necessarily reset. This assures that only during the advance motion a light marking can be passed through the frame marking memory flip-flop SP4. Even if no light markings are to be evaluated the memory flip-flop SP4 is released, since it is conceivable during the advance that also the operation could be switched to light markings evaluation or operation.

If now despite undesired light marking recognition already a light marking is stored in the memory G26, G27 (FIG. 2e), then upon transfer from the pull down phase of the film into the standstill phase of the film (with every release of the frame marking memory flip-flop SP4) the memory G26, G27 is cleared via the gate G29 (FIG. 2f) (control connection Q-output of the memory flip-flop SP3, gate G13, G12 (FIG. 2c). Upon passage from the standstill phase into the pull down phase logical "0" is present at the input of the frame marking memory flip-flop SP4 (FIG. 2e).

Upon desired light markings recognition the potential logical "0" is always at the input of the gate G29 (FIG. 2f), which potential results from the transistor T11 (FIG. 2f) and from the gate G24 (FIG. 2f). Therefor, prestored light memory markings are not cleared and can be transmitted if desired into the frame marking memory flip-flop SP4 (FIG. 2e).

The potential logical "1" passes from the output Q of the output memory flip-flop SP2 via the gates G10 and G9 (FIG. 2b) to the input R of the individual frame memory flip-flop SP1 (FIG. 2b) and blocks the same. This makes it impossible to store during the advance run the information individual frame into the individual frame memory flip-flop SP1.

During the mode of operation "advance run" the key switch 35 has solely the function of a stop switch.

In the following there is now described the result of the actuation of the stop key 35 during advance run operation.

The positive potential of the input $\overline{S}$ is fed to the input S upon actuation of the advance switch key 35. With the aid of gates G1 and G2 (FIG. 2b) this key switch 35 is debounced. After performed pressing of the switch key the potential logical "1" is applied at the outputs of the gate G1, while the potential logical "0" is applied at the outputs of the gate G2. The zero potential passes from the gate G2 to the input of the gate G20 (FIG. 2e). However, this has no result, since here already the potential logical "0" has been applied. Via another control line the potential logical "0" is passed from the gate G2 to the input of the gate G14 (FIG. 2c). The output of the gate G14 becomes logically "1". The potential logical "1" now becomes effective at the reset input of the prememory flip-flop SP5 (FIG. 2c). This prevents that the simultaneous pressing of the advance switch key with the pressed stop switch key 35 results in an effect in the prememory flip-flop SP5.

The potential logical "1" passes from the gate G1 (FIG. 2a) to the input of the gate G30 (FIG. 2a), the output of which becomes logical "0". This is possible because the output of the intermediate memory flip-flop SP6 (FIG. 2b) shows the potential "0" and thereby the output of the gate G17 (FIG. 2b) shows the potential logical "1". The zero potential or respectively the zero potential at the output of the gate G30 (FIG. 2a) is transferred to the input of the gate G1. Thus the stop command of the switch 35 is retained in the memory comprising the gates G1 and G30 (FIG. 2a).

The signal logical "1" at the output of the gate G1 is inverted through the gate G37 (FIG. 2a). The potential at one of these outputs passes to the input of the gate G43 (FIG. 4d) where it does not cause any effect, since this input already shows the potential logical "0" (from the Q-output of the intermediate memory flip-flop SP6 (FIG. 2b), gate G17 (FIG. 2b) and Q-output of the memory SP10 (FIG. 2a) as well as gate G34 (FIG. 2a), G35 (FIG. 2a)). The other outputs of the gate G37 are inverted in their potential by the gates G40 (FIG. 2a) and G49 (FIG. 2a). The output leading to the input of the gate G31 (FIG. 2a) can with respect to its potential not become logically "1", since the memory G44, G45 (FIG. 2d) is already after the taking into operation of the apparatus set such the potential logical "0" is present at the output of the gate G45 (FIG. 2d), which also passes to the input of the gate G31 (FIG. 2a). This provides the signal that the stop order is generated from the mode of operation "advance run". One output of the gate G40 (FIG. 2a) is connected to the input of gate G41 (FIG. 2a). The transfer of the potential from the output of the gate G40 to the input of gate G41 is possible because the outputs of the gate G44 (FIG. 2d) show the potential logical "1". This potential is transferred via the gate G41 and G42 to the input D of the intermediate memory flip-flop SP6 (FIG. 2b). The potential logic "1" is transferred only with the next passage from the standstill phase into the pull down phase of the claw mechanism (compare pulse diagram of FIG. 3). This way the asynchronously actuated stop switch key 35 is synchronized by way of the intermediate memory flip-flop SP6 with the position pulses of the rotating shutter. With the storing of the potential logical "1" into the intermediate memory flip-flop SP6 the potential at the output $\overline{Q}$ changes from logical "1" to logical "0". This edge passes to the clock input T of the individual frame memory flip-flop SP1, where, however, it is without effect, since the reset input R of the individual frame memory flip-flop SP1 shows the potential logical "1", which comes from the output Q of the output memory flip-flop SP2 and from the gates G10 and G9.

In addition, the output Q of the intermediate memory flip-flop SP6 turns to potential logical "1", which potential is inverted (logical "0") through the gate G17. The potential logical "0" is transferred from one output to the input of the gate G30 (FIG. 2a) whereby the storing of the command "stop switch key 35 pressed" is cleared. The output of the gate G1 (FIG. 2a) retains only so long the potential logical "1" until the stop switch key 35 is released. For such time also the potential logical "1" is retained at the input D of the intermediate memory flip-flop SP6.

The potential logical "1" present at the output Q of the intermediate memory flip-flop SP6 passes via gates G17 (FIG. 2b) and G16 (FIG. 2d) to the reset input R of the advance memory flip-flop SP3 and resets the same. It follows, that the frame marking memory flip-flop SP4 is blocked again and that by way of the signal logic "1" of the gate G13 (FIG. 2c) clock pulses from G6 (FIG. 2b) pass again to the clock input T of the advance memory flip-flop SP3 (FIG. 2c). In addition the output memory flip-flop SP2 is not any longer necessarily set by the gates G13 (FIG. 2c) and G12 (FIG. 2c). The output memory flip-flop SP2 however still stores its information, and in fact as long as until the clock input T turns over in its potential from logical "1" to logical "0".

Figure 3:
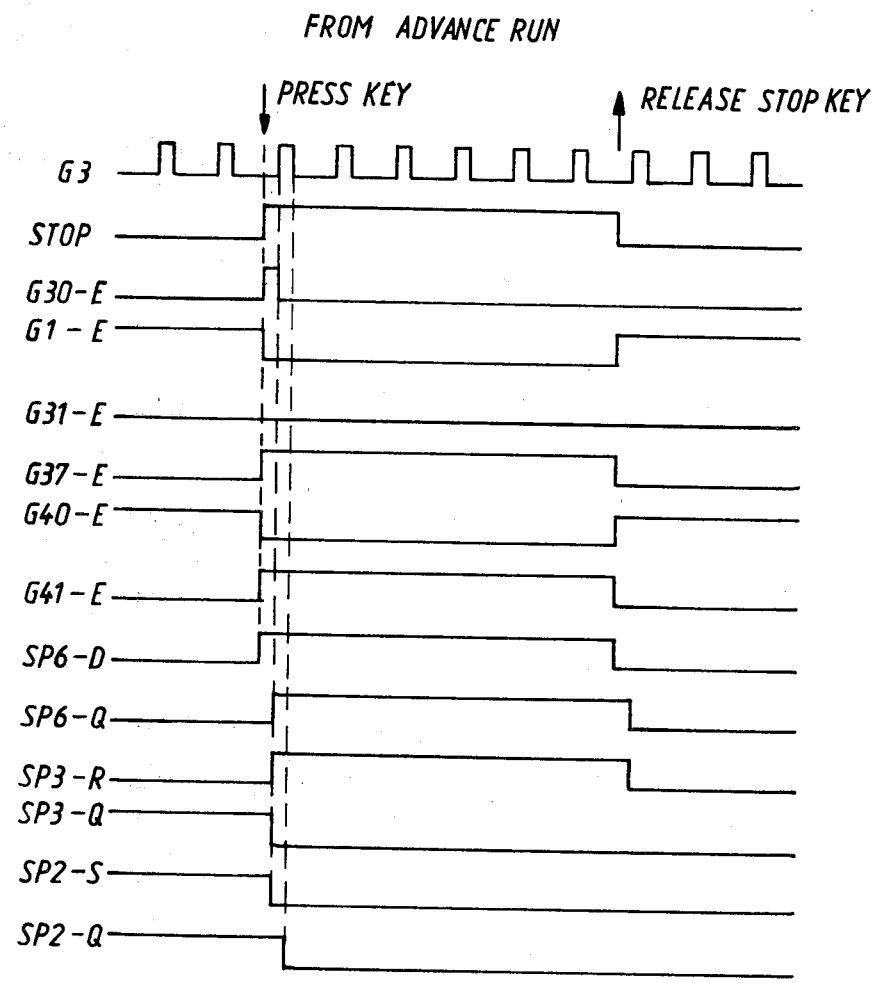
FIG. 3 is a view of a diagram showing the electrical signals for the mode of operation: stop from advance motion.
Figure 4:
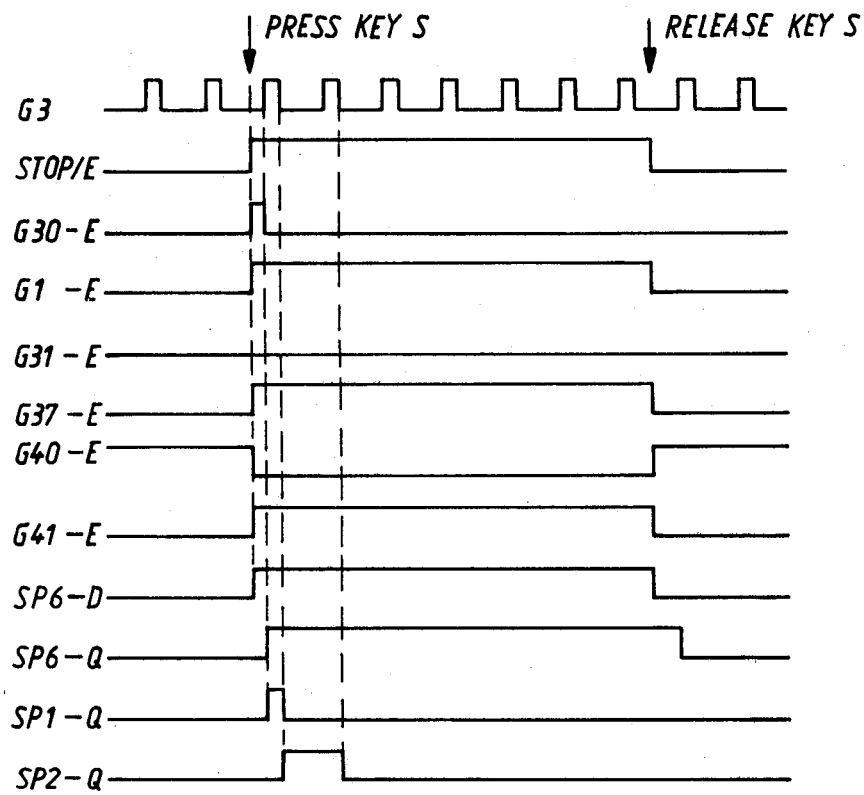
FIG. 4 is a view of a diagram showing the electrical signals for the mode of operation: individual frame operation.
Figure 5:
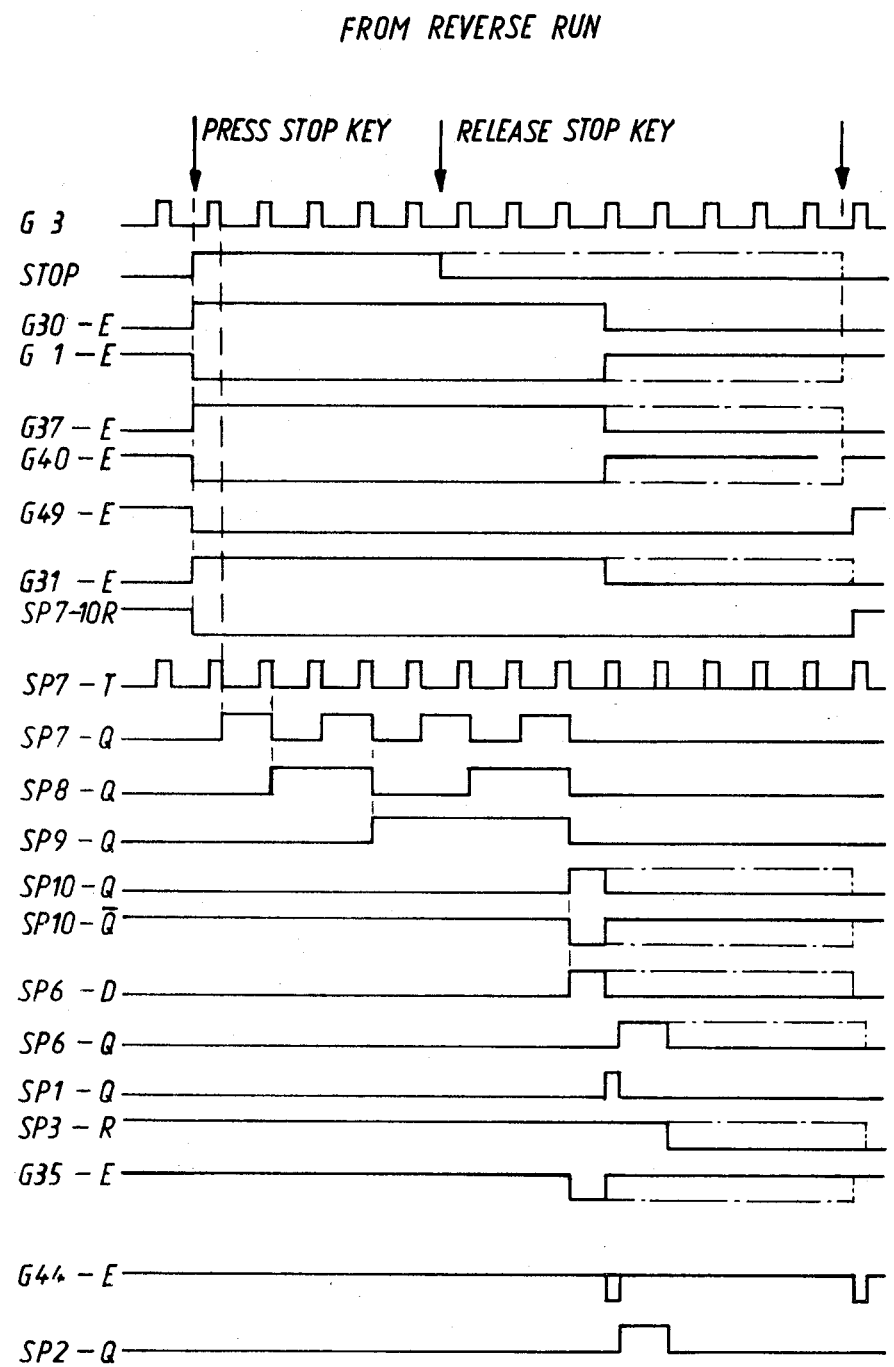
FIG. 5 is a view of a diagram showing the electrical signals for the mode of operation: stop from reverse run.

This is the case if the light position switch changes from the pull down phase 18a into the standstill position of the film (compare pulse diagram of FIG. 3). It can be recognized that a full frame is still transported after the receipt of the stop information by the intermediate memory flip-flop SP6. This is important for the following reasons.

The advance memory flip-flop SP3 is already reset while the last frame is being pulled down or respectively transported. The signal with the potential logical "0" passes from the output of the advance memory flip-flop SP3 (FIG. 2c) via the gates G13 (FIG. 2c) and G12 (FIG. 2c) to the input of the gate G29 (FIG. 2f). Therewith a possible blocking present of the memory G26 (FIG. 2e) and G27 is lifted, which is then effective when no light markings are to be recognized. One in this last pull down phase of the film present light marking will be stored. Thus, by principle, a light marking coming from the last transported frame is stored as a precautionary measure, independent from the situation if light markings are to be recognized and evaluated. This provides the precondition for all possible modes of operation after the stop function is over.

A conceivable mode of operation would be that from the operation "advance without light markings recognition" the stop switch key would be actuated, upon standstill of the film the light marking recognition circuit is turned on and thereafter again the advance key is depressed. If a light marking had been stored as a preparation then in this case the claw mechanism would transport only one frame. Therefor, in a case of a belatedly desired film marking recognition during the standstill of the film there does not become effective the advance run operation.

At the input D of the output memory flip-flop SP2 is present the potential logical "0", after the individual frame memory flip-flop SP1 is reset by the output memory flip-flop SP2. In case now the output memory flip-flop SP2 is reset with the transition of the film from the pull down phase into the standstill phase, then the magnet is energized via the transistors T16 (FIG. 2h) to T20. After the hereto following standstill phase no further frame will be allowed to be transported. This means that during this time the mechanism of the claw system has to be kept disengaged.

The not any longer set output memory flip-flop SP2 (FIG. 2b) releases the individual frame memory SP1 via the gates G10 (FIG. 2b) and G9 (FIG. 2b). The potential logical "0" is transferred to the input of the gate G27 (FIG. 2e) at the same time via gates G10 and G11. This assures that not only during an actually present pull down phase of the film light markings are stored.

If the stop switch key 35 is released, then the outputs of the gate G1 (FIG. 2a) become logical "0". Thereby zero potential is transferred to the input D of the intermediate memory flip-flop SP6 (FIG. 2b) via the gates G37, G40 (FIG. 2a), G41 (FIG. 2a) and G42 (FIG. 2b). The zero potential at the D-input of the intermediate memory flip-flop SP6 (FIG. 2b) is taken into the memory with the transition from a standstill phase into a pull down phase. Only from this point in time the advance memory flip-flop SP3 (FIG. 2c) is again free.

In the following there will be described the stopping of the film based on a light marking signal on the film.

The light marking recognition is released by opening the switch 37 disposed at the input E of the control circuit 30.

If during a pull down phase 18a a light marking passes by at the light barrier (23, 24, 25, 26), then the phototransistor 26 becomes conducting. A positive potential jump follows, which is transferred to the input L of the control circuit 30 via the capacitor 28. The transistor T10 (FIG. 2f) becomes conductive such that at the output of the gate G15 (FIG. 2f) is applied the potential logical "1". The potential logical "1" is also applied to the output of the gate G11 (FIG. 2c) since advance motion is present. Logical 1 is also applied to the gate G6 (FIG. 2b) corresponding to the just occuring pull down phase of the film (light pulse). This "1" potential can now become effective at the memory G26, G27 (FIG. 2e), since the gate G29 (FIG. 2f) is blocked by gate G24 (FIG. 2f). The memory G26, G27 is set such that the input D of the frame marking memory flip-flop SP4 (FIG. 2e) receives the potential logical "1". The clock input T of the frame marking memory SP4 shows at this point in time the potential logical "0".

After ending of the pull down phase 18a of the claw mechanism the clock input of the frame marking memory flip-flop turns over to logical "1". This however does not have an effect for the frame marking memory flip-flop Sp4.

Now the standstill phase of the claw mechanism follows (zero phase of the light pulse). With the transition from the standstill phase to the pull down phase the clock input of the memory SP4 turns from logical "1" to logical "0". Only now the potential logical "1" of the input D of the frame marking memory flip-flop SP4 is picked up by this memory flip-flop. If this has happened the output Q of the frame marking memory flip-flop SP4 carries logical "1" and the output $\overline{Q}$ carries logical "0". This potential logical "0" present at the output Q passes to the input of the gate G27 (FIG. 2e) with the result that the memory G26, G27 is cleared. This is kind of a transfer confirmation. The potential logical "1" at the output Q of the frame marking memory flip-flop SP4 (FIG. 2e) passes via the gates G18 (FIG. 2e) and G16 (FIG. 2d) to the reset input R of the advance memory flip-flop SP3 (FIG. 2c) and resets the flip-flop. Thereby the information "advance run" present in this memory is removed.

The output $\overline{Q}$ of this memory SP3 contains the potential logical "1", which passes to the reset input R of the frame marking memory flip-flop SP4 (FIG. 2e) and resets the same. Thereby the potential of the output $\overline{Q}$ of the frame marking memory flip-flop SP4 changes from logical "0" to logical "1". The memory comprising the gates G26 (FIG. 2e) and G27 is not any longer reset by necessity. It is now again possible to feed in again a light marking for storage.

It should be remarked that at the considered state of operation there is present the start of a pull down phase. The passing of the light marking information through the frame marking memory flip-flop SP4 is necessary because in the first pull down cycle the light marking is written into the gates G26, G27. Before the film is being stopped it has to be transported by one further frame. Therefor, the advance memory flip-flop SP3 can only be cleared after the next standstill phase.

Since with the transition from the pull down phase to the standstill phase of the film also the output memory flip-flop SP2 (FIG. 2b) is cleared, it has to be avoided to clear the advance memory flip-flop SP3 at the beginning of the standstill phase.

Therefor, the leading edge controlled frame marking memory flip-flop SP4 is employed. As control point of reference is employed the clearly defined transition from the standstill phase into the pull down phase (positive pulse edge). As soon as the advance memory flip-flop SP3 is cleared the purpose of the frame marking memory flip-flop SP4 is performed. This is cleared again in order to be ready for a new shifting cycle. This however is only then possible, if the advance memory flip-flop SP3 is set again, that is when frames are again transported.

The reset advance memory flip-flop SP3 (FIG. 2c) lifts the necessary setting of the output memory flip-flop SP2 via the gates G13 (FIG. 2c) and G12. In addition, all other blockages resulting from the advance memory SP3 are lifted, which were described in the operational mode "stopping from an advance run". The memory SP2 remains however in set position, which assures that still a frame is being transported. At the end of the pull down phase the output memory flip-flop SP2 is cleared, whereby the voltage logical "0" applied to the input D of the output memory flip-flop SP2 is transferred at the clock input T into the memory by way of the potential jump from logical "1" to logical "0".

It can also be recognized that initially the light marking is stored in an intermediate memory, then read and that after a standstill phase still a full further frame is transported. Only beginning with the next following standstill phase the magnet 10 is energized for lifting out the claw mechanism from the film perforation.

Now the frame belonging to the corresponding light marking is projected. In addition all those functions now occur again, which have been described for the normal stopping out of an advance run (individual frame memory flip-flop SP1 free, light markings blocked).

Now follows a description of the individual frame function.

The projector is in standstill position. Therefor, no frames are being transported while the rotary shutter is rotating. If now upon standstill of the film the key 35 is actuated, then this key acts as a individual frame key.

A positive signal is transferred from the input $\overline{S}$ to the input S. With the aid of the gates G1 (FIG. 2a) and G2 the key is debounced. After performed key depression the potential logical "1" is present at the gate G1, while at the outputs of the gate G2 the potential logical "0" is applied. The potential logical "0" passes to the input of the gate G20 (FIG. 2e) from the gate G2. However, this has no effect, since at this position already the potential logical "0" is applied after the switching on of the operation voltage and after the resetting of the corresponding circuit stage.

Another conduit transfers the potential logical "0" from the gate G2 to the input of the gate G14 (FIG. 2c). The output of this gate G14 contains the potential logical "1", which becomes effective at the input "R" of the prememory flip-flop SP5.

This prevents that during the pressing of the key 35 the simultaneous actuation of the advance key 34 is stored in the prememory flip-flop SP5 (FIG. 2c). This means that the stop and individual frame switch key 35 is privileged versus the advance switch key.

Logical "1" passes from the gate G1 to the input of gate G30 (FIG. 2a), the output of which contains the potential logical "0". This signal is transferred back to the input of the gate G1. Therewith the stop command is stored in the memory comprising the gates G1 and G30.

This separate memory G1, G30 is necessary in order to store the stop information upon very short actuation of the switch key 35 for such time until it is received into the intermediate memory flip-flop SP6. On the other hand the possibility has to be there to clear this memory again upon continuous depression of the switch key.

An output of the gate G1 is connected to the input G37 (FIG. 2a), the outputs of which become logical "0". One of these outputs applies the potential logical "0" to the input of the gate G43 (FIG. 2d), which however does now show any effect, since this gate is already kept at logical "0" through the gate G37 (FIG. 2a). The other outputs of the gate G37 (FIG. 2a) are connected to the input of the gates G40 (FIG. 2a) and G49 (FIG. 2a).

Since the circuit is placed in the stop phase, the memory comprising the gates G44 (FIG. 2d) and G45 is not set. It follows that the input of the gate G31 (FIG. 2a) shows the potential logical "0", while the input of the gate G41 (FIG. 2a) sits at the potential logical "1". This potential logical "1" passes via the gates G41 and G42 to the D-input of the intermediate memory flip-flop SP6 (FIG. 2b).

At the next transition from the standstill phase to the pull down phase of the film the clock input T of the intermediate memory flip-flop SP6 (FIG. 2b) receives a potential jump from logical "1" to logical "0" with the result that the potential logical "1" applied to the D-input passes to the output Q of the intermediate memory flip-flop SP6. The potential logical "1" of the output Q of the intermediate memory flip-flop SP6 is fed via the gates G17 (FIG. 2b) and G16 (FIG. 2d) to the reset input R of the advance memory flip-flop SP3 (FIG. 2c).

In contrast to the stop operation out of the advance run, this advance memory flip-flop SP3 is already reset with the result that the transmission of the potential logical "1" to the reset input R of the advance memory flip-flop SP3 does not exhibit any consequence.

The potential logical "0" is fed to the input of the gate G30 (FIG. 2a) from the output of the gate G17, whereby the storage of the individual frame switch key actuation 35 is lifted. The outputs of the gate G1 remain for so long still at the potential logical "1" until the stop and individual frame switch key 35 is again released.

The potential jump from logical "1" to logical "0" of the intermediate memory flip-flop SP6 (FIG. 2b) passes to the clock input T of the individual frame memory flip-flop SP1 (FIG. 2b), where it can become effective from the advance run situation in contrast to the actuation of the stop switch key. Since the advance memory flip-flop SP3 (FIG. 2c) and therefor also the output memory flip-flop SP2 (FIG. 2b) are not set, the reset input R of the individual frame memory flip-flop SP1 is situated at the potential logical "0". Since the set input S is always situated at logical "0", the individual frame memory flip-flop SP1 can become active. The potential logical "1" is applied to the input D of the individual frame memory flip-flop SP1. At the point in time when at the output $\overline{Q}$ of the intermediate memory flip-flop SP6 the potential jumps from logical "1" to logical "0", at the output Q of the individual frame memory flip-flop SP1 only the potential logical "1" appears. The potential logical "1" is fed back from the output Q of the individual frame memory flip-flop SP1 to the input D of the output memory flip-flop SP2.

The potential logical "0" applied to the output $\overline{Q}$ of the individual frame memory flip-flop is transferred to the input of the gate G27 (FIG. 2e) and a light marking recognition possibly retained in the memory G26, G27 is cleared.

This assures that before the begin of the film transport the memory G26, G27 is free for a new light marking. In addition, the standstill provisions are the same as those in connection with the light marking recognition. Furthermore, a possibly newly appearing light marking has to be stored in order that after a performed individual frame a command "advance run to a light marking stop" can be performed. This prestoring is performed in any case, even when the individual frames are not to be recognized.

At the next transition from a pull down phase into a standstill phase of the frame, which corresponds to the pulse edge going from logically "1" to logically "0", the potential logical "1" is received, which is applied to the input D of the output memory flip-flop SP2 (FIG. 2b). The output Q receives the potential logical "1", which resets the individual frame memory flip-flop SP1 via the gates G10 (FIG. 2b) and G9. Thus the potential logical "0" is again applied to the input D of the output memory flip-flop SP2. It is the purpose of the individual frame memory flip-flop SP1 to transfer the required information "individual frame" such that on the one side an already prestored light marking is removed from the memory G26 (FIG. 2e), G27 before the film transport proper and that on the other hand there is provided an exact synchronization at the transition from the pull down phase into the stand phase. This provides the possibility to the mechanism involved to become effective in the standstill phase.

The output Q of the now again cleared individual frame memory flip-flop SP1 releases again the memory G26 and G27 so that a possibly occurring light marking can be stored.

The signal logical "1" of the output Q of the individual frame memory flip-flop passes also via the gates G10 (FIG. 2b) and G11 to the input of the gate G27. Up to then this line carried the potential logical "0" and in fact resulting from the gate G6 (FIG. 2b), since at this time the standstill phase of the frame is present.

During the next pull phase the input of the gate G27 is maintained at logical "0" only by the gate G15 (FIG. 2f). If now a light marking occurs, then also this gate becomes of a potential logical "1". The input of the gate G27 jumps with its potential to logical "1" with the result that the memory G26 (FIG. 2e) and G27 is set.

The signal logical "0" of the output $\overline{Q}$ of the memory SP2 passes now to the transistors T16 (FIG. 2h) to T20 with the result that the magnet 19 becomes deenergized and the claw mechanism can become effective.

With the next claw pull down phase a frame is transported on and a possibly occuring light marking is stored in the memory G26, G27. The output of the gate G6 (FIG. 2b) is switched in its potential from logical "1" to Logical "0" at the end of the pull down phase with the transition into the standstill phase and this has the result the the voltage logical "0" applied to the input D of the output memory flip-flop SP2 is taken up by the output memory flip-flop SP2.

The output $\overline{Q}$ of the output memory flip-flop SP2 becomes logical "1" with the result that the magnet 19 is again energized via the transistors T16 (FIG. 2h) to T20. The claw mechanism is decoupled via the solenoid plunger 19. Therefor, the film cannot be transported further.

The output Q of the output memory flip-flop SP2 sits at the potential logical "0". This potential is fed via the gates G10 (FIG. 2b) and G9 to the individual frame memory flip-flop SP1 with the result that this memory flip-flop is again released.

If necessary now a new control signal "individual frame" can be stored.

The storing of light markings is blocked via the gates G10 (FIG. 2b) and G11 (FIG. 2c). The circuit provision is now in the phase "Stop".

If now during the pull down phase during which the frame or respectively the film is transported a light marking is present, then this marking is stored or retained in memory G26, G27 independent from the situation if light markings are to be recognized or not. If now after the above described individual frame processes a light marking recognition is desired and the advance run switch key 34 depressed then necessarily the prememorized light marking is recognized. Therefor, in this case only one frame is transported.

As long as the stop and individual frame switch key 35 remains actuated it is impossible to transport another individual frame. Similarly it is then impossible to switch the advance run. Only the reverse switch key is provided with a privilege. Only when the stop and individual frame key 35 is released the circuit is again in the original switching state.

By having logical "0" have to pass to the input D of the intermediate memory flip-flop SP6 between two actuations of the stop switch at a previously standstill position of the film or with a film previously in advance run, the stop switch key can also be employed as an individual frame switch key.

Now in the following the function of the reverse run is described.

The function "reverse run" is privileged versus all other functions. Therefor it is insignificant in which functional phase of the projection switching circuit 30 the reverse switch key 36 is actuated. The implementation of the signal "reverse run" occurs immediately. In this connection no synchronization to the rotary shutter-position light switch is performed.

If now the reverse key 36 is actuated, then the positive signal is transferred from the input $\overline{R}$ to the input R of the switching circuit 30. This reverse run signal is debounced with the aid of the gates G38 (FIG. 2d) and G39.

Therefor the potential logical "0" is situated at the output of the gate G39. The potential logical "0" coming from the gate G39 passes to the input of the gate G21 (FIG. 2e) and then sets the memory comprising the gates G20 and G21. This memory stores the command "reverse run" also after released reverse run key 36.

One output of the gate G21 is connected to the input of the gate G22 (FIG. 2e), the outputs of which become logical "0". One of these outputs places the potential logical "0" at the gate G9 (compare FIG. 2b), which upon a potential logical "1" at the output side resets the individual frame memory flip-flop SP1 in case that in this memory flip-flop is stored just an individual frame.

An output of the gate G22 (FIG. 2e) effects via a corresponding control conduit the setting of the memory G44 (FIG. 2d), G45. Thus beside the actuation of the reverse run switch key 36 the command "reverse run" is stored and in fact for such time until a preset time interval provided by the memories SP7 to SP10 has passed. In addition, it is decided in this memory if an information coming from the stop- and individual frame switch key 35 is to run via a time delay or directly to the intermediate memory flip-flop SP6.

The outputs of the gate G23 (FIG. 2e) contain the potential logical "1". One of these outputs resets the memory SP2. If the electromagnet 19 is just deenergized, then it will be energized based on the resetting of the output memory flip-flop SP2. The result is that the claw system is lifted out of the perforation of the film 13.

A further output of the gate G23 (FIG. 2e) resets via the gates G31 (FIG. 2a), G32 and G33 (FIG. 2a) the memories SP7, SP8, SP9, and SP10. A possible running time delay is immediately stopped.

A third output of the gate G23 provides the potential logical "1" via the gates G19 (FIG. 2e) and G16 (FIG. 2d) to the advance memory flip-flop SP3 (FIG. 2c) and resets the same also, if an advance run signal had been stored. In addition, the prememory SP5 (FIG. 2c) is reset via the gates G19 and G14 (FIG. 2c).

Since the outputs of the gate G19 contain the potential logical "0", this signal acts on the memory formed by the gates G26 (FIG. 2e) and G27 and resets it into its rest position. A possibly stored light marking of the film is therewith extinguished.

The frame marking memory flip-flop SP4 is also reset by the reset advance memory flip-flop SP3.

All blockages effected by the reverse run switch key 36 remain effective so long as the memory G20 (FIG. 2e), G21 remains set. Thereby also all position switch pulses are ineffective at the input P. Therefor, the function "reverse run" has priority versus all other modes of operation and engages in a corresponding way the switching circuit.

The clearing of the memory G20, G21 is only possible via the stop key 35. This achieves that it is not possible to switch directly from reverse run into advance run. The clearing is performed via connection point A10.

In the following there is described the stopping of the film after actuation of the stop switch key.

It is assumed that the reset switch key 36 is pressed and then released. Thus a reverse run function is in operation. The film is transported backwards now by a mechanical drive or respectively electromechanical drive without a claw mechanism.

An edge of logical "1" to logical "0" passes to the input T of the prememory flip-flop SP5 upon pressing of the advance run switch key in that mode of operation. This edge however remains without effect, since the reset potential logical "1" is applied to the input R of the prememory flip-flop SP5. Therefore, it is not possible to switch from the reverse run operation into the advance run operation.

The only possibility to lift the reverse run function is to actuate the stop and individual frame switch key 35. If now the switch key 35 is actuated, the potential at the outputs of the gate G1 becomes logical "1", while the outputs at the gate G2 become logical "0".

It should be remarked at this point that this is only possible with a released reverse run switch key 36, since otherwise the output of the gate G20 obtains the potential logical "1", the input of G21 however is kept at the potential logical "0" by the gate G39 (FIG. 2d).

If now the stop and individual frame switch key 35 and the reverse run switch key 36 are actuated at the same time, then the previously described way of connection of the memory G20, G21 assures that the function of the reverse run has priority over the function of stopping. All signals required for the reverse run therefor have to be derived from the gate G21.

After now the memory G20, G21 (FIG. 2e) has been reset via the connecting line A10 all blockages initiated by gate G21 are again lifted. With one exception the switching circuit is now in the potential state at the switching on of the operating voltage and the therewith connected resetting. This difference to the state at switching on is based on memory G44 (FIG. 2d), G45 still remaining set. This means that the already terminated reverse run function remains stored. The memory G44, G45 therefor forms a remembrance memory.

The signal contents of the remembrance memory G44, G45 and the information coming from the stop switch key 35 effect together the switching on of a time function.

Herein the potential logical "1" passes from the gate G1 (FIG. 2a) via the gate G37 (FIG. 2a) and G49 (FIG. 2a) to the gate G31 (FIG. 2a). The potential logical "0" coming from gate G44 (FIG. 2d) blocks the gate G41 (FIG. 2a) and prevents an immediate storage into the memory SP6. The outputs of the gate G31 are now all with their potential at logical "0" with the result that the memories SP7 to SP10 are not any longer reset.

The memories SP7 to SP10 form a counting chain. They are not any longer necessarily reset, where the memories SP7 and SP8 are directly and the memories SP9 and SP10 are via the gates G32 (FIG. 2a) and G33 connected to the gate G31.

The position switch pulses coming from input P are fed to the input T of the memory SP7 via the transistor T3 and the gate G3 (FIG. 2b) such that one step is counted further always at the transition from the pull down phase to the standstill phase of the film (transition from logical "1" to logical "0"). Since the memories SP7 to SP10 had been reset previously and necessarily via their inputs R, also after the lifting of this reset signal the potential logical "1" is present at their outputs $\overline{Q}$. This holds also for the output $\overline{Q}$ of the memory SP7, which is connected to the input D of the same memory.

As soon as a clock pulse (edge of logical "1" to logical "0") occurs the voltage of logical "1" applied to input D is taken up by the memory. Thus after this edge the potential logical "1" is present at the output Q of the memory SP7, while at its output $\overline{Q}$ the potential logical "0" is present.

At the next position pulse (edge from logical "1" to logical "0") at the input T of the memory SP7 now the potential logical "0" applied to the input D is accepted by the memory SP7. Therewith, again the potential logical "0" is at the output Q while the potential logical "1" is present at the output $\overline{Q}$. This potential jump is fed from the output Q on to the clock input T of the following memory SP8. This memory accepts the potential logical "1" present at the input D. The memories SP7 to SP10 work like a dual counter, where each memory also divides the frequency applied to input T by 2.

After eight pulses, which correspond approximately to a time of 0.5 seconds, the output Q of the memory SP10 is set to a potential of logical "1". This signal is inverted (logical "0") via the gate G34. The potential logical "0" passes to the input T of the memory SP7 and prevents a further counting of position switch pulses into the counting chain SP7 to SP10.

The output $\overline{Q}$ of the memory SP10 is at a potential of logical "0". This potential passes now to the input of the gate G49 (FIG. 2a). Thus the output of the gate G49 is necessarily kept at a potential of logical "1". This achieves that only the reset memory G44 and G45 can reset the counting chain.

The potential logical "0" of the gate G34 now passes to the gate G35 (FIG. 2a), the output of which could accept the potential logical "1". This is however not possible, since the second input of the gate G35 (FIG. 2a) is kept at logical "1" from the output of gate G17 (FIG. 2b).

The potential logical "0" of the gate G34 (FIG. 2a) passes to the gate G42 (FIG. 2b) the output of which becomes logical "1". This signal is now applied to the input D of the intermediate memory flip-flop SP6 (FIG. 2b). The intermediate memory flip-flop SP6 takes on the potential logical "1" applied to input D at the next transition from a standstill phase of the film into a pull down phase of the film. Therewith the output Q of the intermediate memory flip-flop SP6 is switched to logical "1". The potential logical "1" is now changed to logical "0" via gate G17 (FIG. 2b) and fed to the gate G35 (FIG. 2a). The output of the gate G35 would like to switch its potential to logical "1", which is not possible since it is kept at logical "0" by the gate G37 (FIG. 2a). In addition the potential logical "1" passes via gate G17 (FIG. 2b) and G16 (FIG. 2d) to the reset input of the advance memory flip-flop SP3 (FIG. 2c). This however does not show any effect, since this memory flip-flop had already been reset.

The output $\overline{Q}$ of the intermediate memory flip-flop SP6 (FIG. 2b) turns over from logical "1" to logical "0". This potential jump is stored in the individual frame memory flip-flop SP1 with the result that the mode of operation "individual frame" is switched on.

The output of the gate G17 (FIG. 2b) provides the potential logical "0" to the input of the gate G30 (FIG. 2a). This clears the stop function stored in the memory G1 and G30.

If now the stop key 35 is also actuated, then at the input of the gate G1 is still the potential logical "0". Only when the key is released the potential information logical "1" can become effective coming from gate G30.

This has the result that the outputs of the gate G1 (FIG. 2a) become logical "0". Thereby the outputs of the gate G37 (FIG. 2a) receive the potential logical "1" with the result that the last blockage is lifted of the connection between the gates G35,G37 and the gate G43 (FIG. 2d).

Only now the output of the gate G43 (FIG. 2d) becomes logical "0" and the so-called remembrance memory G44 (FIG. 2d), G45 becomes cleared for the reverse run.

Even though stop switch key 35 had been released the potential logical "0" does not pass to the input of the gate G31, since the potential logical "0" passes from the output $\overline{Q}$ of the memory SP10 to the gate G49 (FIG. 2a). The further transmission of the potential logical "0" to the input of the gate G31 (FIG. 2a) is only then performed when the remembrance memory G44 (FIG. 2d), G45 has in fact been cleared, since this memory then places from gate G45 the potential logical "0" to the gate G31 (FIG. 2a).

Only now the counting chain is cleared. The output of the memory SP10 becomes logical "0". This zero potential is further transmitted via the gates G34 (FIG. 2a) and G42 (FIG. 2b) to the D-input of the intermediate memory flip-flop SP6. The logical state for the stopping of the film is reached. The film is disposed in proper position in front of the film gate.

In the following there is now described the timer function of the switching and control circuit 30.

The timer circuit forms a proper switching group by itself. A difference stage is constructed from the transistors T26 (FIG. 2g) to T33 where a reference voltage is generated at the base of the transistor T31 by way of the resistors R27 and R28. The base of the transistor T26 is connected to a time capacitor 32 via the connection point C and the time capacitor 32 forms a timing member together with the adjustable resistor 31. As soon as the threshold voltage of the transistor T26 is reached, the difference stage turns over and the transistor T25 becomes conducting.

The output of the gate G50 is now provided with the potential logical "1". This potential logical "1" is inverted (logical "0") via gate G36 (FIG. 2e). This logical potential jump becomes effective at the input T of the memory SP5 (FIG. 2b). Therewith the function of the advance run has been initiated and is performed as described above.

As soon as the output memory flip-flop SP2 is set, the potential logical "1" passes via gate G10 (FIG. 2b) and gate G11 (FIG. 2c) to the gate G4 (FIG. 2f). The output of the gate G4 receives the potential logical "0". Thereby on the one hand the potential logical "1" is applied to the prememory flip-flop SP5 (FIG. 2c) via the gate G36 (FIG. 2e). On the other hand the time capacitor 32 connected via gate G52 (FIG. 2f) and gate G53 (FIG. 2g) to the connection point C is discharged via the resistor R24 (FIG. 2g).

The input T in FIG. 2f provides a similar effect. If this input is open then the potential logical "0" passes to the outputs of the gate G28 (FIG. 2f). Thereby a possibly charged time capacitor 32 is immediately discharged via the gates G52 (FIG. 2f) and gate G53 (FIG. 2g).

Both variations, that is advance run or open input T effect that the capacitor is continuously discharged. Only when the advance run is stopped and at the input T a regulated voltage is applied, then the capacitor can charge up.

An exception is provided by the stop operation out of a reverse run. In this case the potential logical "0" from the gate G48 (FIG. 2d) passes to the input of the gate G52 (FIG. 2f). Thereby the capacitor cannot charge up, although a positive signal is applied to the input T and no advance run is occuring. If stopping occurs from a reverse run, then initially a certain time determined by the counting chain SP7 to SP10 passes by. Also during this time the capacitor may not yet be charged up. This is prevented by gate G51 (FIG. 2d), which applies the potential logical "0" so long to the gate G52 (FIG. 2f) as the counter is running or as long as the stop switch key 35 remains depressed. Upon depressed stop switch key the timer does not initiate an advance run. This holds also upon stopping from an advance run as well as for an individual frame.

The connection of the gate G48 (FIG. 2d) with the input S of the intermediate memory flip-flop SP6 effects that the intermediate memory flip-flop SP6 is definedly set upon switching on of the operating voltage. Thus a stop switch key depressed before application of the operating voltage cannot lead to an individual frame. In this case the stop command is transmitted immediately as such.

Upon actuation of the stop switch key 35 and the thereupon following stopping of the film or in individual frame operation of after stopping of the film based on a marking present on the film there is provided the switching on of the timer circuit via the gate G11 (FIG. 2c) in connection with the control lines A17 and A27 and in connection with the gates G4 (FIG. 2f) and gates G28 (FIG. 2f), G52 (FIG. 2f). After passage of the timer interval there is provided automatically a cycling of the prememory flip-flop SP5 via the control line A28. Therewith (Control potential jump from logical "1" to logical "0") the control circuit is switched into advance run operation.

It will be understood that each of the elements described above, or two or more together, may also find a useful application in other types of system configurations and signal processing procedures in motion picture apparatus and projector control differing from the types described above.

While the invention has been illustrated and described as embodied in the context of a motion picture apparatus controlled by an integrated circuit based on integrated injection logic, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Motion picture apparatus comprising
    an electric drive device;
    a rotary disc shutter actuated by the electric drive device;
    a shutter sector forming part of the rotary shutter;
    a claw mechanism controlled by the electric drive device and providing for transport of a film;
    an electromagnet to control the motion of the film;
    a solenoid plunger associated with the electromagnet and suitable for disengaging the claw transport mechanism after a frame transport phase;
    a position pulse generator providing a shutter position pulse depending on the position of the shutter sector;
    a function switch; and
    an output memory element connected to the electromagnet for controlling the energization of the electromagnet and connected to the switch and to the position pulse generator.

2. The motion picture apparatus according to claim 1 wherein the motion picture apparatus is a projector.

3. The motion picture apparatus according to claim 1 wherein the position pulse generator provides a pulse during the blocking time of the shutter.

4. The motion picture apparatus according to claim 1 further comprising control means disposed at the rotary disc shutter for making available the pulses provided by the position pulse generator such that the pulses with respect to their length and phase coincide in each case with the claw pull down phase in the film transport direction.

5. The motion picture apparatus according to claim 1 wherein the function switch is a film advance switch.

6. The motion picture apparatus according to claim 1 wherein the function switch is a film stop switch.

7. The motion picture apparatus according to claim 1 wherein the function switch is a film reverse run switch.

8. The motion picture apparatus according to claim 1 wherein the output memory element is an output memory flip-flop.

9. The motion picture apparatus according to claim 8 wherein the memory flip-flop is fed with a position pulse edge at the end of the claw pull down following to a control signal from the switch via the set or clock input for providing position determining energization and deenergization of the electromagnet at the end of the claw pull down phase of the claw mechanism.

10. The motion picture apparatus according to claim 8 further comprising
    a second memory flip-flop connected to the function switch for storing the signal provided by the function switch as an intermediate memory flip-flop and connected to the output memory flip-flop for transmitting the stored signal at the end of the claw pull down phase.

11. The motion picture apparatus according to claim 10 wherein the function switch is a stop switch further comprising
    a stop prememory disposed between the stop switch and the intermediate memory flip-flop.

12. The motion picture apparatus according to claim 11 further comprising a clear connection between the stop prememory and the output of the intermediate memory flip-flop.

13. The motion picture apparatus according to claim 12 further comprising
    a film advance switch;
    an advance memory flip-flop connected to the film advance switch and having its clock input (T) connected to the pulse position generator for responding only to the pulse edge at the end of the claw pull down phase;
    a set input (S) of the output memory flip-flop;
    an output (Q) of the advance memory flip-flop connected to the set input (S) the output memory flip-flop;
    a clock input (T) of the intermediate memory flip-flop, to which flip-flop is connected the stop switch, connected to the position pulse generator to be actuated only by the pulse edge at the start of the claw pull down phase;
    a reset input (R) of the advance memory flip-flop; and an output (Q) of the intermediate memory flip-flop connected to the reset input of the advance memory flip-flop.

14. The motion picture apparatus according to claim 13 further comprising an advance prememory disposed between the advance switch and the advance memory flip-flop.

15. The motion picture apparatus according to claim 14 further comprising
    a clear connection between the advance prememory and the output (Q) of the advance memory flip-flop.

16. The motion picture apparatus according to claim 13 further comprising
    an individual frame memory flip-flop coordinated to the output memory flip-flop and which individual frame memory flip-flop is necessarily in reset position upon advance operation of the apparatus;
    an output (Q) of the individual frame memory flip-flop;
    a control input (D) of the output memory flip-flop connected to the output (Q) of the individual frame memory flip-flop;
    a reset input (R) of the individual frame memory flip-flop;
    an output (Q) of the output memory flip-flop connected to the reset input (R) of the individual frame memory flip-flop;
    a clock input (T) of the individual frame memory flip-flop where upon actuation of the stop switch the necessary reset of the advance memory flip-flop and the necessary set of the output memory flip-flop is lifted such that upon renewed actuation of the now as an individual frame switch acting stop switch after passing of at least one position pulse the individual frame memory flip-flop is set with the leading edge of the position pulse at the start of the claw pull down phase; and
    that the output memory flip-flop remains set for a position pulse period starting with the trailing edge of the position pulse.

17. The motion picture apparatus according to claim 16 further comprising
    a control input disposed at the individual frame memory flip-flop and not connected.

18. The motion picture apparatus according to claim 16 further comprising
a control input disposed at the individual frame memory flip-flop and connected to a constant potential.

19. The motion picture apparatus according to claim 16 further comprising
a marking signal generator for generating a signal depending on the position of a marking on the film;
a frame marking memory flip-flop;
a control input (D) of the frame marking memory flip-flop connected to the marking signal generator;
an output (Q) of the frame marking memory flip-flop;
a reset input (R) of the advance memory flip-flop connected to the output (Q) of the frame marking memory flip-flop;
a reset input of the frame marking memory flip-flop;
an inverted output ($\overline{Q}$) of the advance memory flip-flop connected to the reset input (R) of the frame marking memory flip-flop;
a clock input (T) of the frame marking memory flip-flop connected to the position pulse generator and controlled by the pulse edge at the start of the claw pull down phase.

20. The motion picture apparatus according to claim 16 where the memory flip-flops are D flip-flops.

21. The motion picture apparatus according to claim 16 where the reset input and the set input of the intermediate memory flip-flop are connected to ground.

22. The motion picture apparatus according to claim 16 where the memory flip-flops are disposed in sequence and where the following memory flip-flops have control lines from their respective outputs to the reset or respectively clear input of the preceding memory flip-flop.

23. The motion picture apparatus according to claim 16 further comprising
a frame marking prememory disposed between the frame marking memory flip-flop and the marking signal generator.

24. The motion picture apparatus according to claim 23 further comprising a clear connection disposed between the frame marking prememory and the frame marking memory flip-flop.

25. The motion picture apparatus according to claim 1 further comprising
function memory flip-flops for effecting desired function control in the apparatus;
a reverse switch;
a reverse memory connected to the reverse switch for resetting necessarily the output memory flip-flop and other function associated memory flip-flops for decoupling the claw mechanism by way of the electromagnet during a reverse run.

26. The motion picture apparatus according to claim 25 further comprising
a reverse stop memory following to the reverse memory clearable by actuation of the stop switch such that after clearing of the reverse memory all necessary resets of memory flip-flops are lifted.

27. The motion picture apparatus according to claim 26 further comprising
a delay chain switched on in connection with the control pulse produced upon actuation of the stop switch that after passing of a time delay depending on the time for placing the reverse motor into standstill an output of the delay chain, which is necessarily reset upon every other operation and function modes, is provided via a corresponding control conduit to the control input (D) of a function memory flip-flop suitable for starting a control sequence of an individual frame.

28. The motion picture apparatus according to claim 26 further comprising
a counting chain switched on in connection with the control pulse produced upon actuation of the stop switch that after passing of a time delay depending on the time for placing the reverse motor into standstill an output of the counting chain, which is necessarily reset upon every other operation and function modes, is provided via a corresponding control conduit to the control input (D) of a function memory flip-flop suitable for starting a control sequence for an individual frame.

29. The motion picture apparatus according to claim 1 further comprising
a prememory flip-flop having a clock input (T);
a time delay circuit connected to the clock input (T) of the prememory flip-flop and a start control connection connecting the output of the output memory flip-flop to the time delay circuit for providing after a delay time for setting the circuit again for advance operation after a decoupling of the claw mechanism.

30. The motion picture apparatus according to claim 29 further comprising a stop switch connecting circuit for switching on the start control connection only after release of the stop switch.

31. The motion picture apparatus according to claim 1 further comprising an advance memory flip-flop having
a control input (D);
a time delay circuit connected to the control input (D) of the advance memory flip-flop; and
a start control connection connecting the output of the output memory flip-flop to the time delay circuit for providing after a delay time for setting the circuit again for advance operation after a decoupling of the claw mechanism.

32. The motion picture apparatus according to claim 31 further comprising a stop switch connecting circuit for switching on the start control connection only after release of the stop switch.

33. A method for controlling the motion of a motion picture comprising
rotating a rotary shutter having a shutter sector;
transporting the film with a claw film transport mechanism while the shutter sector blocks a film gate;
generating a position pulse corresponding to the position of the shutter sector and the pulse corresponding with respect to time and phase to the claw pull down mechanism of the film in film advance direction;
feeding the position pulse continuously to a control circuit for an electromagnet;
feeding signals from operator controlled function switches to the control circuit comprising at least a multivibrator;
storing in the multivibrator a position pulse following a signal from a switch; and
energizing or respectively deenergizing the electromagnet at the end of the claw pull down phase of the claw mechanism.

34. The method for controlling according to claim 33 further comprising employing the rotary shutter for interrupting a light beam in order to generate a signal corresponding to the position of the shutter sector.

35. The method for controlling according to claim 34 further comprising
deflecting at certain positions of the rotary shutter the light beam.

36. The method for controlling according to claim 34 further comprising
path-folding the light beam into a direction parallel to the axis of the rotary shutter by attaching a second mirror to the shutter.

37. The method for controlling according to claim 34 further comprising
sensing the interrupted light beam with an optoelectronic converter.

38. The method for controlling according to claim 33 further comprising
inserting a register pin forming part of the claw mechanism into the film perforation for transporting the film.

39. The method for controlling according to claim 38 further comprising
controlling the motion of the register pin with an electromagnet.

40. The method for controlling according to claim 33 wherein the multivibrator is a memory flip-flop having a set and a clock input.

41. The method for controlling according to claim 40 further comprising
feeding a pulse edge of a position pulse following to a function switch signal and occuring about the beginning of the claw pull down phase to a memory flip-flop via its clock input for providing an intermediate storage of the corresponding function switch signal; and storing the corresponding function signal at the next following position pulse edge at the end of the claw pull down phase into the output memory flip-flop.

42. The method for controlling according to claim 33 further comprising
feeding a signal from an advance switch to the control input (D) of an advance memory flip-flop;
feeding a position pulse to the clock input (T) of the advance memory flip-flop which responds only to the pulse edge at the end of a claw pull down phase;
feeding a signal from the output (Q) of the advance memory flip-flop to the set input (S) of the output memory flip-flop;
feeding a signal from a stop switch to the control input (D) of an intermediate memory flip-flop;
feeding the position pulse signal to the clock input (T) of the intermediate memory flip-flop, which responds only to the pulse edge at the beginning of the claw pull down phase;
feeding the output (Q) of the intermediate memory flip-flop via a control line to the reset input (R) of the advance memory flip-flop.

43. The method for controlling according to claim 42 further comprising
maintaining the set input (S) and the reset input (R) of the intermediate memory flip-flop at ground potential.

44. The method for controlling according to claim 43 further comprising
feeding the output of a following memory flip-flop to the reset input of a preceding memory flip-flop, where the following memory flip-flop is controllable by the preceding memory flip-flop.

45. The method for controlling according to claim 43 further comprising
feeding the output of a following memory flip-flop to the clear input of a preceding memory flip flop, where the following memory flip-flop is controllable by the preceding memory flip flop.

46. The method for controlling according to claim 42 further comprising
forcing the individual frame memory flip-flop into a set position upon individual frame operation;
feeding the output (Q) of the individual frame memory flip-flop to the control input (D) of the output memory flip-flop;
feeding the output (Q) of the output memory flip-flop to the reset input (R) of the individual frame memory flip-flop;
feeding the output of the intermediate memory flip-flop via a control conduit to the clock input (T) of the individual frame memory flip-flop;
lifting the necessary reset of the advance memory flip-flop and the necessary set position of the output memory flip-flop upon actuation of the stop switch;
setting the individual frame memory flip-flop with the leading edge of the position pulse at the beginning of the claw pull down phase upon renewed actuation of the stop switch now acting as an individual frame advance switch after passing of at least one position pulse; and
maintaining the output memory flip-flop is set position for a position pulse period starting with the trailing edge of the position pulse.

47. The method for controlling according to claim 46 further comprising
maintaining the individual frame memory flip-flop with a disconnected control input.

48. The method for controlling according to claim 46 further comprising
maintaining the individual frame memory flip-flop with a control input connected to a constant control potential.

49. The method for controlling according to claim 33 further comprising
sensing markings on a film with a sensing device;
generating control signals depending on the markings sensed;
feeding the marking control signals to the control input (D) of a frame marking memory flip-flop;
feeding the output (Q) of the frame marking memory flip-flop to the reset input (R) of the advance memory flip-flop;
feeding the inverted input ($\overline{Q}$) of the advance memory flip-flop to the reset input (R) of the frame marking memory flip-flop;
controlling the clock input (T) of the frame marking memory flip-flop with the pulse edge of the position pulse at the beginning of the claw pull down phase.

50. The method for controlling according to claim 49 wherein the edges of the pulses control memory flip-flops which are D-flip-flops.

51. The method for controlling according to claim 49 wherein the sensing device comprises a light beam being measured after passing through the film.

52. The method for controlling according to claim 51 further comprising converting the light beam modified by the transmission of the film in the area of the markings with an optoelectronic converter.

53. The method for controlling according to claim 51 further comprising
guiding the light beam coming from a light source between the light source and the film with an optical guide.

54. The method for controlling according to claim 49 further comprising
feeding the signal from the stop switch to the intermediate memory flip-flop via an intermediate prememory.

55. The method for controlling according to claim 54 further comprising
feeding the output (Q) of the intermediate memory flip-flop via a clear control conduit to the preceding intermediate prememory.

56. The method for controlling according to claim 49 further comprising
feeding the signal from the advance switch via an advance prememory to the advance memory flip-flop.

57. The method for controlling according to claim 56 further comprising
feeding the output (Q) of the advance memory flip-flop via a clear control conduit to the preceding advance prememory.

58. The method for controlling according to claim 49 further comprising
feeding the signal from the marking signal generator to the frame marking memory flip-flop via a marking prememory.

59. The method for controlling according to claim 58 further comprising
feeding the output (Q) of the frame marking memory flip-flop via a clear control conduit to the preceding marking prememory.

60. The method for controlling according to claim 33 further comprising
feeding a switch signal from a reverse run switch to a reverse memory, which necessarily resets any functional memory flip-flops and provides for decoupling of the claw mechanism by way of the electromagnet during a reverse run.

61. The method for controlling according to claim 60 further comprising
switching on a reverse stop memory to the reverse memory being erasable upon actuation of a stop key;
lifting all necessary resets of any functional memory flip-flops after clearing of the reverse memory;
switching on a delay chain with the reverse stop memory in connection with a control pulse generated upon actuation of the stop switch;
feeding a control pulse to the control input (D) of an intermediate memory flip-flop via a corresponding control conduit from an output pulse of the delay chain, which in all other modes of operation and functioning is in a reset position after passing of a delay time, whereby the control sequence is started for an individual frame.

62. The method for controlling according to claim 60 further comprising
switching on a reverse stop memory to the reverse memory being erasable upon actuation of a stop key;
lifting all necessary resets of any functional memory flip-flops after clearing of the reverse memory;
switching on a counting chain with the reverse stop memory in connection with a control pulse generated upon actuation of the stop switch;
feeding a control pulse to the control input (D) of an intermediate memory flip-flop via a corresponding control conduit from an output pulse of the counting chain, which in all other modes of operation and functioning is in a reset position after passing of a delay time, whereby the control sequence is started for an individual frame.

63. The method for controlling according to claim 33 further comprising
feeding a start control signal from the output of an output memory flip-flop to a time delay circuit; and feeding a delayed signal from the time delay circuit to the clock input of a prememory flip-flop, whereby after passing of the delay time span the control circuit is again switched to advance operation after the decoupling of the claw mechanism corresponding to a proper frame position based on a light marking pulse or based on actuation of a stop switch.

64. The method for controlling according to claim 33 further comprising
feeding a start control signal from the output of an output memory flip-flop to a time delay circuit; and feeding a delayed signal from the time delay circuit to the control input of an advance memory flip-flop, whereby after passing of the delay time span the control circuit is again switched to advance operation after the decoupling of the claw mechanism corresponding to a proper frame position based on a light marking pulse or based on actuation of a stop switch.

65. The method for controlling according to claim 33 further comprising
switching on a start control circuit only upon release of a stop switch, which start control circuit comprises a connecting circuit.

* * * * *